(12) United States Patent
Murphy et al.

(10) Patent No.: US 12,238,244 B2
(45) Date of Patent: *Feb. 25, 2025

(54) PROVIDING ENHANCED CALL CONTENT TO A MOBILE DEVICE

(71) Applicant: FIRST ORION CORP., North Little Rock, AR (US)

(72) Inventors: Brandon Wayne Murphy, Little Rock, AR (US); Jay Todd Callaway, Conway, AR (US)

(73) Assignee: FIRST ORION CORP., North Little Rock, AR (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/318,710

(22) Filed: May 16, 2023

(65) Prior Publication Data

US 2023/0291832 A1 Sep. 14, 2023

Related U.S. Application Data

(63) Continuation of application No. 17/229,845, filed on Apr. 13, 2021, now Pat. No. 11,683,415.

(51) Int. Cl.
*H04M 3/436* (2006.01)
*H04M 3/42* (2006.01)
*H04M 3/428* (2006.01)
*H04W 4/16* (2009.01)

(52) U.S. Cl.
CPC ....... *H04M 3/436* (2013.01); *H04M 3/42042* (2013.01); *H04M 3/428* (2013.01); *H04W 4/16* (2013.01)

(58) Field of Classification Search
CPC .. H04M 3/346; H04M 3/42042; H04M 3/428; H04W 4/16
USPC ........................................................ 455/415
See application file for complete search history.

(56) References Cited

U.S. PATENT DOCUMENTS

| 5,784,438 | A | 7/1998 | Martinez |
| 6,384,927 | B1 | 5/2002 | Mori |
| 6,931,007 | B2 | 8/2005 | Jones |
| 8,054,949 | B2 | 11/2011 | Lee et al. |
| 8,301,701 | B2 | 10/2012 | Goodman et al. |
| 8,626,848 | B2 | 1/2014 | Cohen et al. |
| 10,771,624 | B1 | 9/2020 | Penar et al. |
| 11,323,561 | B2 | 5/2022 | Prodanovic et al. |
| 11,570,295 | B2 | 1/2023 | Murphy et al. |
| 11,683,415 | B2 * | 6/2023 | Murphy ................ H04M 3/436 455/415 |
| 2002/0067812 | A1 | 6/2002 | Fellingham et al. |
| 2003/0112941 | A1 | 6/2003 | Brown et al. |
| 2005/0073725 | A1 | 4/2005 | Lim |
| 2005/0100150 | A1 | 5/2005 | Dhara et al. |
| 2005/0132060 | A1 | 6/2005 | Mo et al. |

(Continued)

FOREIGN PATENT DOCUMENTS

WO 2006080819 A1 8/2006

*Primary Examiner* — Binh Kien Tieu

(57) ABSTRACT

One example may include identifying a header of a call message includes enhanced call data, identifying a code object from the call header identifying textual information and one or more images to display during a call connection, displaying the textual information and the one or more images identified from the code object on a mobile device, and connecting a call to the mobile device.

20 Claims, 19 Drawing Sheets

(56) References Cited

U.S. PATENT DOCUMENTS

| | | | |
|---|---|---|---|
| 2005/0220095 A1* | 10/2005 | Narayanan | H04L 69/329 370/389 |
| 2005/0262205 A1* | 11/2005 | Nikolov | G06Q 10/107 709/206 |
| 2008/0076456 A1 | 3/2008 | Jung et al. | |
| 2009/0003552 A1* | 1/2009 | Goldman | G06Q 10/107 379/88.22 |
| 2010/0287249 A1* | 11/2010 | Yigang | G06Q 10/107 709/206 |
| 2011/0035444 A1 | 2/2011 | Hill | |
| 2011/0145694 A1 | 6/2011 | Graves et al. | |
| 2012/0030039 A1 | 2/2012 | Gutiérrez | |
| 2012/0093146 A1 | 4/2012 | Blomkvist | |
| 2012/0151492 A1 | 6/2012 | Ripberger | |
| 2015/0095643 A1 | 4/2015 | Adams | |
| 2015/0186603 A1 | 7/2015 | Buckle | |
| 2015/0312044 A1 | 10/2015 | Tonegawa | |
| 2016/0127542 A1 | 5/2016 | Kim et al. | |
| 2016/0164816 A1* | 6/2016 | Bhagwan | H04L 51/234 709/206 |
| 2016/0165047 A1 | 6/2016 | Gray et al. | |
| 2017/0134459 A1 | 5/2017 | Shetty et al. | |
| 2017/0140434 A1 | 5/2017 | Lin | |
| 2017/0223065 A1 | 8/2017 | Fan et al. | |
| 2018/0365436 A1 | 12/2018 | Shitrit et al. | |
| 2019/0045036 A1* | 2/2019 | Rahat | H04L 67/561 |
| 2019/0045335 A1 | 2/2019 | Jin et al. | |
| 2019/0361877 A1* | 11/2019 | Rogynskyy | G06Q 10/1095 |
| 2020/0027068 A1 | 1/2020 | Studnicka | |
| 2020/0274964 A1 | 8/2020 | Ravichandran | |
| 2020/0322332 A1 | 10/2020 | Haque et al. | |
| 2021/0144521 A1 | 5/2021 | Saifee et al. | |
| 2022/0086277 A1 | 3/2022 | Murphy et al. | |
| 2022/0086282 A1 | 3/2022 | Shirahatti et al. | |
| 2022/0103539 A1 | 3/2022 | Rose et al. | |
| 2023/0334221 A1* | 10/2023 | Lefebvre | G06F 40/10 |

* cited by examiner

340

360

370

PROVIDING ENHANCED CALL CONTENT TO A MOBILE DEVICE

CROSS-REFERENCE TO RELATED APPLICATION

This application is a continuation of U.S. non-provisional patent application Ser. No. 17/229,845, filed on Apr. 13, 2021, the entire disclosure of which is incorporated be reference herein.

This application is related to, U.S. non-provisional patent application Ser. No. 17/229,841 entitled, "ENHANCED CALL CONTENT DELIVERY WITH MESSAGE CODE,", U.S. non-provisional patent application Ser. No. 17/229,847 entitled, "PROVIDING ENHANCED CALL CONTENT," and, U.S. non-provisional patent application Ser. No. 17/229,849 entitled, "PROVIDING ENHANCED CALL CONTENT BASED ON CALL NUMBER ASSOCIATION," each of which was filed on Apr. 13, 2021 and are incorporated herein by reference in its entirety.

BACKGROUND

Conventionally, mobile device users receive calls with limited resources regarding identification of the call source or other useful information that could assist the called party to identify the calling party. With the introduction of the rich call data (RCD) standard there has been an increase in the call management industry to develop ways to forward call related data with the calls that are sent while staying within the confines of an industry standard.

Additionally, most call content platform capabilities apply generally to the 'CallerID' field since handset manufacturers have yet to implement features that would permit for the passing of media assets (e.g., images, icons, etc.) that would be displayed during the ringing event of an incoming call. The RCD standard encourages handset manufacturers to expose the 'Call-Info' header along with the 'Display_Name' header ('CallerID'). This type of header will permit for other data to be passed to the handset through the network. The process for sharing such data within the confines of the standards and the message protocols remains open to new arrangements.

SUMMARY

Example embodiments of the present application provide at least a method that includes at least one of a call management procedure. One example method of operation may include one or more of identifying a call notification of a call intended for a mobile device, retrieving call data comprising a code object identifier with the call notification, forwarding the call data comprising a code object to the mobile device based on the code object identifier prior to forwarding the call, and forwarding the call to the mobile device.

Another example embodiment may include an apparatus that includes a processor configured to identify a call notification of a call intended for a mobile device, retrieve call data comprising a code object identifier with the call notification, forward the call data comprising a code object to the mobile device based on the code object identifier prior to the call being forwarded, and forward the call to the mobile device.

Yet another example embodiment may include a non-transitory computer readable storage medium configured to store instructions that when executed cause a processor to perform one or more of identifying a call notification of a call intended for a mobile device, retrieving call data comprising a code object identifier with the call notification, forwarding the call data comprising a code object to the mobile device based on the code object identifier prior to forwarding the call, and forwarding the call to the mobile device.

Yet another example embodiment may include a method that includes one or more of identifying a header of a call message comprises enhanced call data, identifying a code object from the call header identifying textual information and one or more images to display during a call connection, displaying the textual information and the one or more images identified from the code object on a mobile device, and connecting a call to the mobile device.

Yet another example embodiment may include an apparatus that includes a processor configured to identify a header of a call message comprises enhanced call data, identify a code object from the call header identifying textual information and one or more images to display during a call connection, display the textual information and the one or more images identified from the code object, and connect a call.

Still yet another example embodiment may include a non-transitory computer readable storage medium configured to store instructions that when executed cause a processor to perform one or more of identifying a header of a call message comprises enhanced call data, identifying a code object from the call header identifying textual information and one or more images to display during a call connection, displaying the textual information and the one or more images identified from the code object on a mobile device, and connecting a call to the mobile device.

Yet another example embodiment may include a method that includes one or more of receiving a message comprising call data for a future call between a calling party and a called party, identifying a profile identifier from the call data identifying an enhanced call information profile associated with the calling party, and creating a call message header with a code object comprising the enhanced call information to include with a call message when placing the future call.

Yet another example embodiment may include an apparatus that includes a receiver configured to receive a message comprising call data for a future call between a calling party and a called party, and a processor configured to perform one or more of identify a profile identifier from the call data identifying an enhanced call information profile associated with the calling party, and create a call message header with a code object comprising the enhanced call information to include with a call message when placing the future call.

Yet another example embodiment may include a non-transitory computer readable storage medium configured to store instructions that when executed cause a processor to perform receiving a message comprising call data for a future call between a calling party and a called party, identifying a profile identifier from the call data identifying an enhanced call information profile associated with the calling party, and creating a call message header with a code object comprising the enhanced call information to include with a call message when placing the future call.

Yet another example embodiment may include receiving a call, identifying whether a calling party number and a called party number associated with the call have a pre-existing relationship stored in a database, responsive to identifying the pre-existing relationship, modifying a call message header of a call message to include a code object identifying enhanced call content, and forwarding the modified call message to an intended recipient device of the call.

Still yet another example embodiment may include an apparatus that includes a receiver configured to receive a call, and a processor configured to perform one or more of identify whether a calling party number and a called party number associated with the call have a pre-existing relationship stored in a database, responsive to the pre-existing relationship being identified, modify a call message header of a call message to include a code object identifying enhanced call content, and forward the modified call message to an intended recipient device of the call.

Still yet another example embodiment may include a non-transitory computer readable storage medium configured to store instructions that when executed cause a processor to perform one or more of receiving a call, identifying whether a calling party number and a called party number associated with the call have a pre-existing relationship stored in a database, responsive to identifying the pre-existing relationship, modifying a call message header of a call message to include a code object identifying enhanced call content, and forwarding the modified call message to an intended recipient device of the call.

DETAILED DESCRIPTION

Figure 1A:
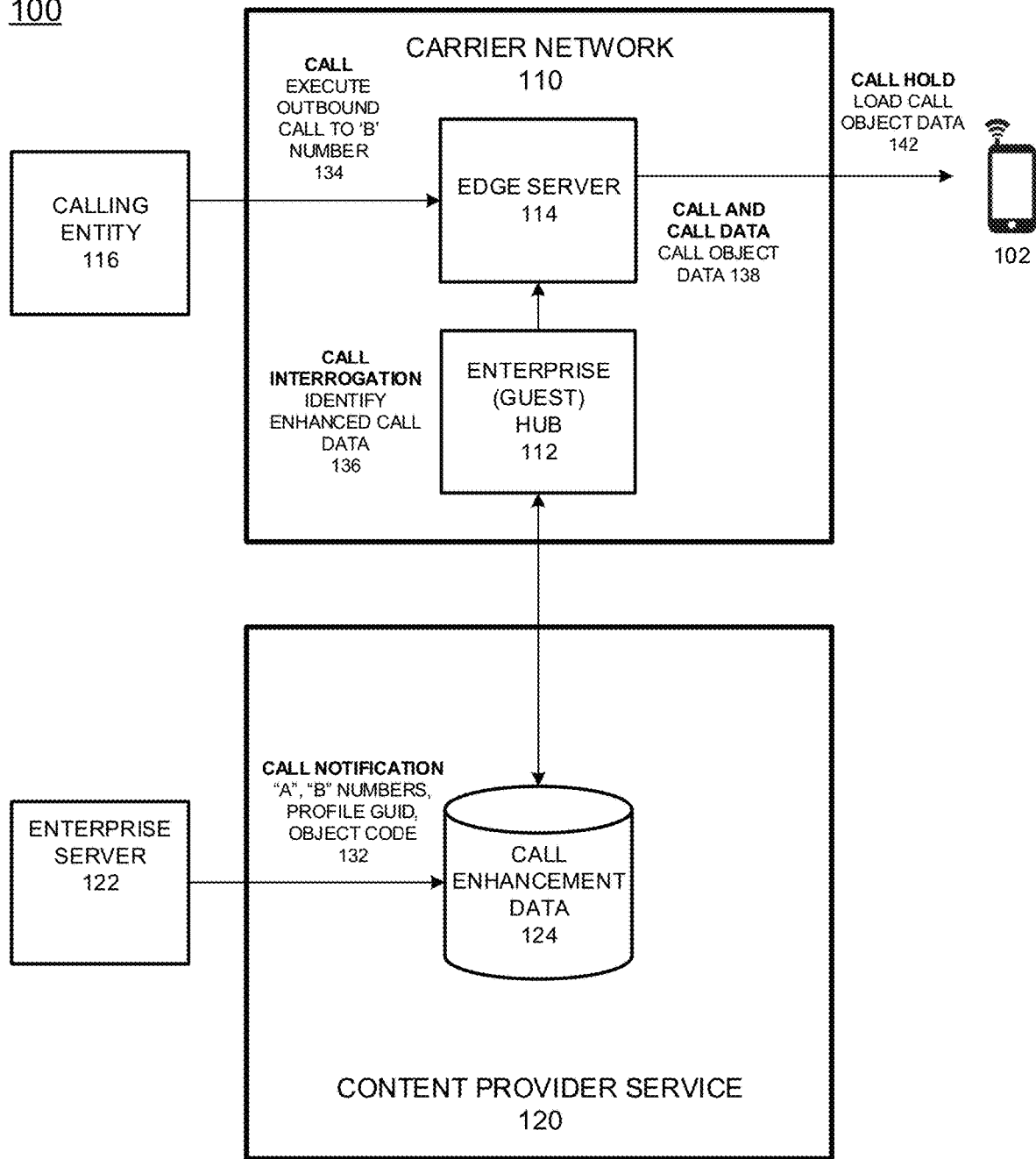
FIG. 1A illustrates an example call management network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call content management of content in associations with calls to and from mobile device users. Enterprise entities (e.g., government, corporate, etc.) may desire to have their services readily identified to mobile device users when providing appointments, services, advertising, etc. Mobile device users require secure communication channels to reduce fraud associated with scam callers and other falsified entities seeking to monetize from users by using unexpected and undesirable approaches, such as solicitation calls and mobile device messaging, such as short message service (SMS) messages.

One example embodiment includes a process to directly inject rich call data (RCD) metadata via a data object, such as a JAVASCRIPT object notation (JSON) object, directly into the call information header using specific in-network and call enhancement (ECI) tools and procedures. The process may include an operational platform that permits verified, contracted entities to utilize a call enhancement web portal or call enhancement push application programming interface (API) to notify the platform of a future call and what enhanced profile data to share for certain call relationships (e.g., 'A' caller and 'B' callee).

The metadata included in the "push" to an enhanced call content provider may include various parameters which are to be used and included in the metadata provided to the mobile device call recipient (callee) during a call session and prior to the call session as included in call data sent to the call recipient device. Examples of the metadata may include an 'A' number (calling entity number), the 'B' number (called entity number), a start date/time to initiate the loading of the call data, and an end date/time to stop the loading of the call data, and a profile globally unique identifier (GUID) used to identify which enhanced call data profile to select and apply to the call transmitted to the callee. The start date/time may also identify a date/time content can start being passed to the 'B' number from the network for the identified 'A' number, the end date/time may be the date/time content should no longer be passed to the 'B' number from the network for the identified 'A' number.

According to one example embodiment, the content management application may use an existing architectural approach that permits call enhancement data to be appended to call message data that is then received and loaded as a custom display name. This process permits the metadata received from a registered entity to be received, produced into a deliverable data item portion of a data message and delivered to the network for subsequent calls which are associated with such an enhanced call data profile. The platform may use the profile metadata provided by the client to retrieve the "content" to be passed on to the called device. In one example, this call content may be a display name that is displayed prior to and/or during a call session. In this example, the platform creates a data message that includes the 'A' number, 'B' number, start date/time, end date/time, display name, and a program globally unique identifier (GUID) and delivers it to the network using the network devices deployed into the carrier network.

According to example embodiments, the data information sharing process may be adjusted to accommodate RCD information sharing, the software application enhanced call information sharing platform ('platform') will use the program GUID provided by the entity in the push operation to compile the data object which may be a jcard JSON object which is a JSON version of a vCARD used to identify profile information. This data may include a business name, logo, purpose of the call among other types of shared data and may also include other types of enhanced call content that is invoked on a recipient device during a call operation. All of the data elements included in the call enhanced data may be existing data artifacts included in the client profiles that are used by a content provider entity to deliver the enhanced calling information to the called devices via a software development kit (SDK) application. The platform will generate the JSON object along with a download link (URL) for the object data to be retrieved, which is not included in the header of a data message (e.g., SIP) packet. The platform will pass on to the network the 'A' number, 'B' number, start date/time, end date/time, JSON jcard download URL (i.e., a location where the jcard can be downloaded), and profile GUID, which will be stored in the content provider hub device disposed in or in communication with the carrier (cellular service) network.

FIG. 1A illustrates an example call management network configuration according to example embodiments. Referring to FIG. 1A, the network system 100 includes integration of both the carrier network 110 (cellular provider) and the enterprise enhanced call content service 120. As calling parties attempt to place calls, such as enterprise clients utilizing the content service 120, the enterprise server of the client 122 may be the starting point of a call being placed to a particular 'B' number of a called device 102. The call may include the 'B' number information, the 'A' number of the caller information and other information which may specify the particular content profile the caller is desiring to use for the call as identified by the GUID. All such information associated with the call may be part of a call and/or call notification 132 that is sent from the enterprise client to the content provider service 120 which has its own entity in the carrier network 110 for managing call content.

In one example, the enterprise entity may identify certain object code 132 to be included in the call as identified by the profile GUID of the enhanced call data, or, alternatively, the enhanced call profile may be discovered by pairing the 'A' and 'B' number with known information in the carrier network 110 and/or the call enhancement database 124 to identify the matching call profile linked to that call data. When a calling entity 116 executes the call the enterprise server 122 may notify the call enhancement platform 124 via the call notification 132, which is intended for a mobile device 102. The call being executed 134 may cause the edge server 114 of the carrier network 110 to interrogate 136 the call data database 124 and retrieve call data. The enterprise guest hub 112 may retrieve the enhanced call data 124 and create a modified call message or notification that includes a code object identifier which will be sent with the call notification data. The call and/or call notification including the code object may be forwarded 138 to the mobile device 102. The specific code object may be based on the code object identifier or GUID profile either before or with the call which is also forwarded to the mobile device.

The interrogating process may identify the call and any call data associated with the incoming call including the call notification to determine whether enhanced call information is associated with the call. The enhanced data profile associated with the call may be discovered by a profile identifier in the original call or one stored in a database that is assigned to the call based on the 'A', 'B' or both the caller and callee telephone numbers identified from the database. An 'A' caller may have multiple profiles which can be assigned to a particular call to deliver enhanced call data and any one of those profiles may be assigned based on the identifier included in the call or may be based on the association with other call data included in the call.

When the enhanced call data is selected along with a profile, the code object may then be appended to a call header of the call data prior to forwarding the call. In one example, the edge server 114 may receive a confirmation message that the code object was extracted and loaded on the mobile device 102. In this example, when the confirmation is received, the call may be forwarded to the device 102 since the enhanced call data is not displayed on the device 102. However, the confirmation message may not be needed as the device 102 may load its call content and maintain the call in suspension 142 until the object data is loaded. The process may also include processing the object data and retrieving content identified from the code object from a remote site, such as the logo information, and forwarding the content to the mobile device prior to connecting the call to the mobile device. Other approaches may include creating content, such as logos from code in the code object data. This may include unpacking and loading base64 image data identified in the code that was received. Although various different types of code may be used to create and manage enhanced call content on the recipient device 102, the code object is a JAVASCRIPT object notation (JSON) object in this particular example.

Figure 1B:
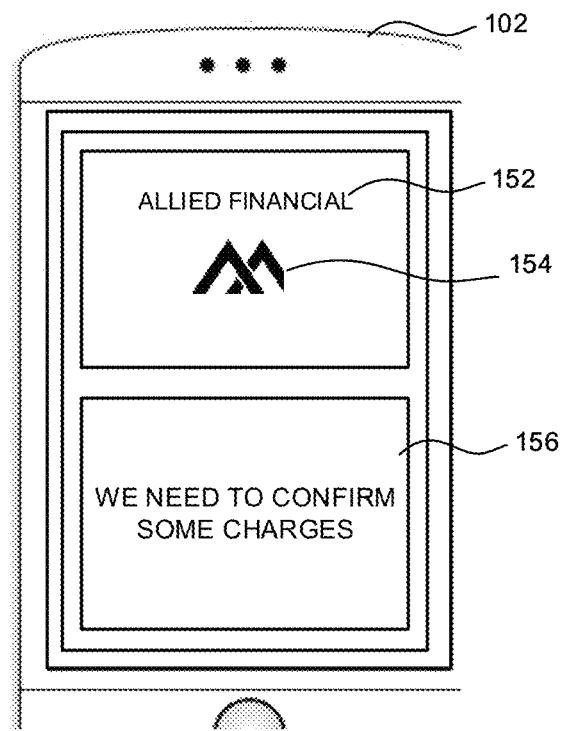
FIG. 1B illustrates an example call recipient device user interface according to example embodiments.

FIG. 1B illustrates an example call recipient device user interface according to example embodiments. Referring to FIG. 1B, the example user interface 150 may be the display interface of the intended recipient device 102. The example includes the name of the organization 152 associated with the 'A' device/entity/caller, the logo of the organization 154 and a message or 'reason' for calling. Other information may be added to the called recipient device display screen depending on the content of the code object data and the capabilities of the called recipient device 102.

The hub 112 will use the data entries received from the call enhancement platform of the content provider 120 by comparing the 'A' number/'B' number pairs of each of the incoming calls to the 'A' number/'B' number pairs of the push data received from clients that have used the call enhancement platform. When a match is identified as having been previously paired and stored as a database entry, the hub 112 will insert the JSON object associated with that particular pair into the call-info header portion of a call message (e.g., SIP call message). The insertion may follow the established RCD standards while including the content or links to the content in the header information. One example may provide: "Call-Info:<https://example.com/jbond.JSON>; call-reason="Regarding your restaurant reservation".

An example of call-info being delivered to the recipient device, may include an enhanced call content push from the bank 'Allied Financial'. The bank may be an enterprise client calling a client (i.e., person with a device 102) regarding some suspicious charges from their account. In this case, the enterprise entity would like their name, logo, and a reason for the call to display on the calling screen of the called device 102. When the hub 112 identifies the 'A' number for the 'Allied Financial' group, the call may be placed to the 'B' number that 'Allied Financial' originally placed to the call enhancement API, the hub 112 will insert the correct metadata into the call info header portion of a call message(s). In this example, the call-info may provide: <https://d1njov4vvqn7.cloudfront.net/vcards/object5.JSON>; call-reason="We need to confirm some charges."

In this example, the call message header will be passed through the network to the recipient device 102 as part of the SIP traffic of the incoming call. The OEM dialer of the device 102 will download the JSON object from the URL provided before it displays the incoming call to the user. The information included in the header may include:

```
["vcard", [
   ["version", { }, "text", "4.0"],
   ["fn", { }, "text", "Allied Financial"],
   ["tel", { "type": ["voice", "text", "cell"], "pref": "1" }, "uri",
   "tel:+1-202-555-1000"],
   ["logo", { }, "uri", "http://d1njov4vvqn7.cloudfront.net/images/af.jpg"]
]]
   OR
   ["vcard", [
   ["version", { }, "text", "4.0"],
   ["fn", { }, "text", "Allied Financial"],
   ["tel", { "type": ["voice", "text", "cell"], "pref": "1" }, "uri",
      "tel:+1-202-555-1000"],
   ["logo", {}, "uri", "data:image/jpeg;base64,MIICajCCAdOgAwIBAgIC
AQEEBQAwdzELMAKGA1UEBhMCVVMxLDAqBgNVBAoTI05ldHNjYXBlIENvbW11bm
ljYXRpb25zIENvcnBvcmF0aW9uMRwwGgYDVQQLExNJbmZvcm1hdGlvbiBTeXN0
   <...the remainder of base64-encoded data...>"
   ]].
```

As may be observed from the JCARD object code, the call message header may include a link to content, such as an image file which can be independently downloaded and inserted into the call user interface or the base64 image data can be loaded directly from the information in the header without additional data being downloaded. In other words base64 data can be used to assemble a logo or image based on content of the data. Upon downloading the JSON object from the URL in the call info header, the dialer will parse the JSON data. If using the URL download to obtain the logo, the dialer of the device 102 will need to perform a second download using the URL provided. The second download is only necessary if the base64 image data is not provided since that data can be used independently of a remote source to create the image data and display an image on the display screen.

The dialer will parse the JSON and will build the incoming call screen using the information provided. The dialer will not present the incoming call to the user until the JSON object code is parsed and the call screen can be populated with the RCD content. The calling screen should not "update" with content. The OEM dialer should hold the call until the content is parsed and downloaded or until a timeout period is reached. The content from the jcard of the object code may include 'fn' or a name that displays on the OEM dialer call screen and in the call log, 'tel' or a phone number that displays on the OEM dialer call screen and in the call log, 'logo' 512×512 pixel image that displays on the OEM dialer call screen and in the call log from the call-info header, and a call reason for the call that is displayed as sub-text on the OEM dialer screen.

The call data rules for incoming calls (calls currently arriving) in-call (calls in session), and call log (calls logged after the call) for RCD compliant calls may include various operations and processes to manage the call. The incoming call screen during an incoming call may include the provided JSON object will with 'fn', 'tel', and 'logo' as required. The call-reason will be included in the 'call-info' header with the URL for the JSON object. The OEM dialer will parse and use the information in the call-info header and in the jcard to build the incoming call screen. The OEM dialer will not display the incoming call to the user until the call screen is built. The in-call screen may be controlled by the OEM dialer and will persist the 'fn', 'logo', 'tel', and 'call-reason' on the 'in-call' screen.

The call log screen may include certain information, for calls that include the call-info header RCD content, and the OEM dialer will append the 'fn', 'tel', and 'logo' with the call entry. The OEM dialer will not append the RCD content to all calls that match the 'tel' and will only append the RCD content to the specific call that includes RCD content in the call-info header.

The enterprise clients can use the real-time API to push enhanced call content to the hub 112 in the network 100. However, the application and RCD-based push approach would permit the enterprise to send an image and custom text in the push to the hub 112. Additionally, the 15-Character 'CallerID' would be expanded to a 35-Character Name. In this example, an enterprise client using the enhanced call data services would access the real-time push API and a JSON code object will be created that includes the 35-character name, the image (or link), and the custom text, and would send such data to the hub 112 in the network 100 along with the 'A' number and 'B' number.

When a call from the enterprise ('A' number) to the client ('B' number) occurs in the network, the JSON code object will be inserted into the 'Call_Info' header. This code object would then be forwarded to the call device 102 through the network 100 when the call itself is performed from the 'A' number to the 'B' number. The handset would be updated to read/process the JSON code object received from the 'Call_Info' header and create the calling screen (e.g., image, name, custom text).

Example embodiments of enhanced call content sharing may include a process of passing a 15-character name and a base64 image code into the network for an enterprise client having that name and image display on the calling screen and in the call log for the consumer being called.

Another example embodiment includes a process for passing a 15-character name and an image URL (e.g., jpeg, png, svg, etc.) directly into the network for a business and having that name and image display on the calling screen and in the call log for the consumer the enterprise entity is calling.

Another example embodiment includes a process for passing a jcard JSON object that includes the enterprise entity name, a reason for calling, and base64 image code directly into the network for a business and having that name, image, and reason for calling display on the calling screen and in the call log.

Another example embodiment includes a process for passing a reason code along with a jcard JSON object that includes the business name and base64 image code directly into the network for a business and having that name, image, and reason for calling display on the calling screen and in the call log.

Another example embodiment includes a process for passing a jcard JSON object that includes the business name, reason for calling, and a URL link for an image directly into the network for a business and having that name, image, and reason for calling display on the calling screen and in the call log for the consumer the business is calling.

Another example embodiment includes a process for passing a reason code along with a jcard JSON object that includes the business name and URL link for an image directly into the network for a business and having that name, image, and reason for calling display on the calling screen and in the call log for the consumer the business is calling.

Figure 2A:
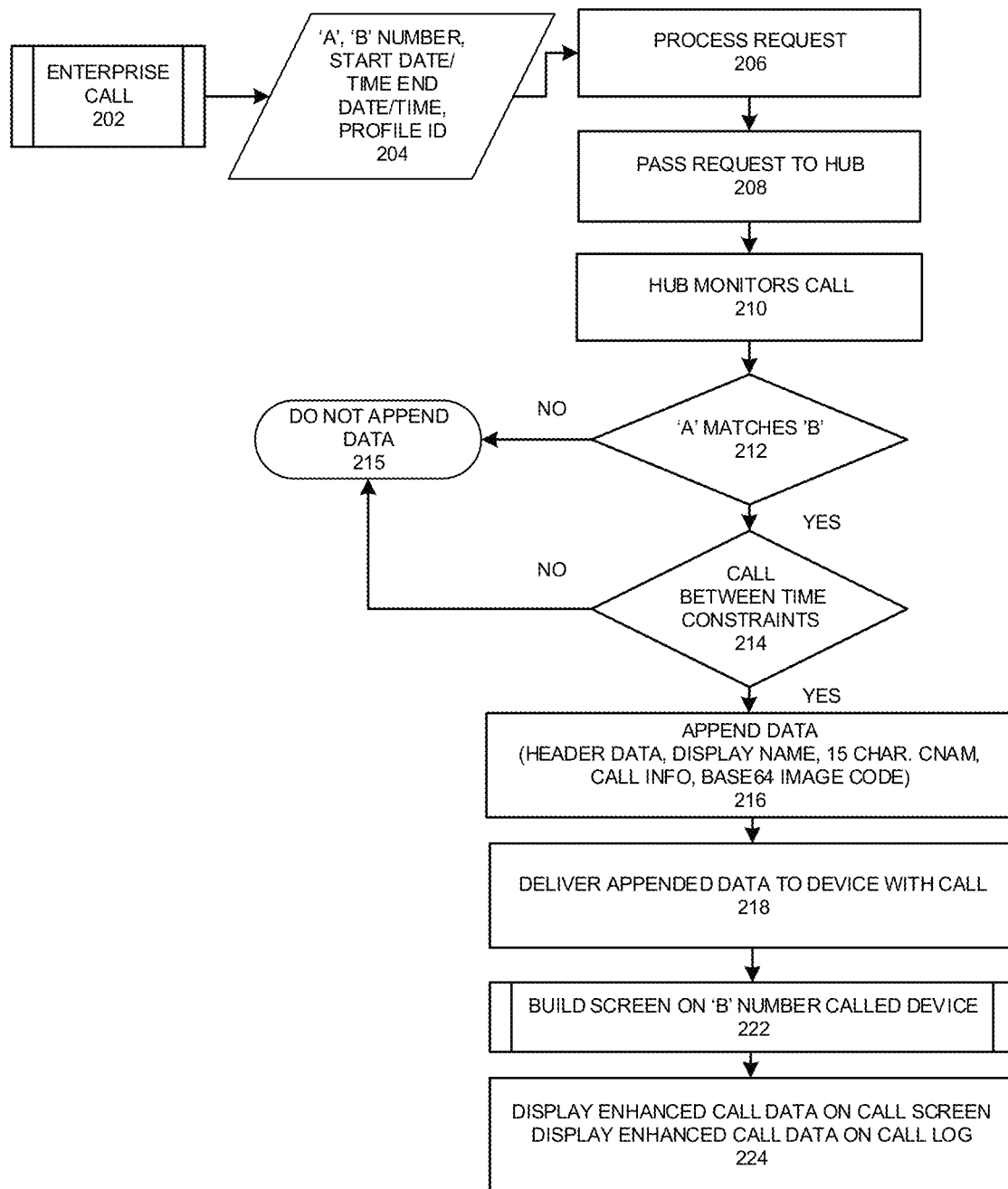
FIG. 2A illustrates an example flow diagram of one example for sharing enhanced content during a call according to example embodiments.

FIG. 2A illustrates an example flow diagram of one example process for sharing enhanced content during a call according to example embodiments. Referring to FIG. 2A, the system 200 includes an enterprise placed call 202 that will pass the 'A' number, 'B' number, start date/time, end date/time, 15-character business name, and the base64 image code 204 to the hub 112. The information is identified from the original call data 204 and a request is created 206 for the network to create a work object that can be shared 208 with the hub 112 which will continue to monitor the call 210 and perform various operations to ensure the correct data is sent to the caller. When the hub 112 identifies the 'A' number calling the identified 'B' number as a match 212 stored in a database as a known relationship, then the call time constraints are identified 214 at a date/time that is between the start date/time and the end date/time included in the call data. If such data is not identified then the data is not appended 215, and if such data is identified, then the 15-Character 'name' in the from header will be appended 216 along with the base64 image code in the call-info header.

Figure 3A:
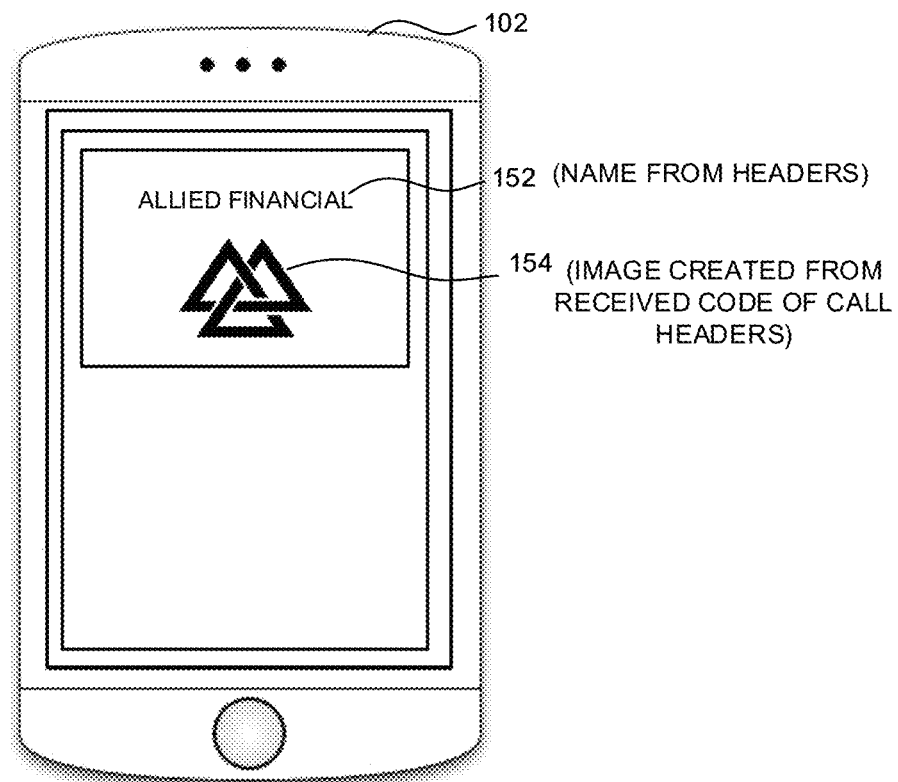
FIG. 3A illustrates one example of a user interface of a call recipient device displaying received enhanced content during a call according to example embodiments.

The appended data may be sent 218 to the called device 102 with the call or before the call depending on the system. In this example, the received content is processed 222 and the screen of the called device 102 may display the enhanced call data 224. The content is displayed on the call screen and includes the enhanced call content during the call and the call log after the call. The call header information fields include in the "From:" field: "Allied Finance", and in the "Call-Info:" field "data:image/jpeg; base64, MIICajCCA-dOgAwIBAgICAQEEBQAwdzELMAk GA1UEBhMCVVMxLDAqBgNVBAoTI05ldHNjYX-BlIENvbW11bmljYXRpb25zIENvcnBvcmF0aW9u-MRwwGgYDVQQLExNJbmZvcm1hdGlvbiBTeXN0 < . . . the remainder of base64-encoded data . . . >". When the call is placed to the device 102, the software data from the phone manufacturer reads the data in the "From" and "Call-Info" headers and builds the incoming call screen using the data. That data is also used to populate the call log. This example is illustrated in FIG. 3A.

Figure 2B:
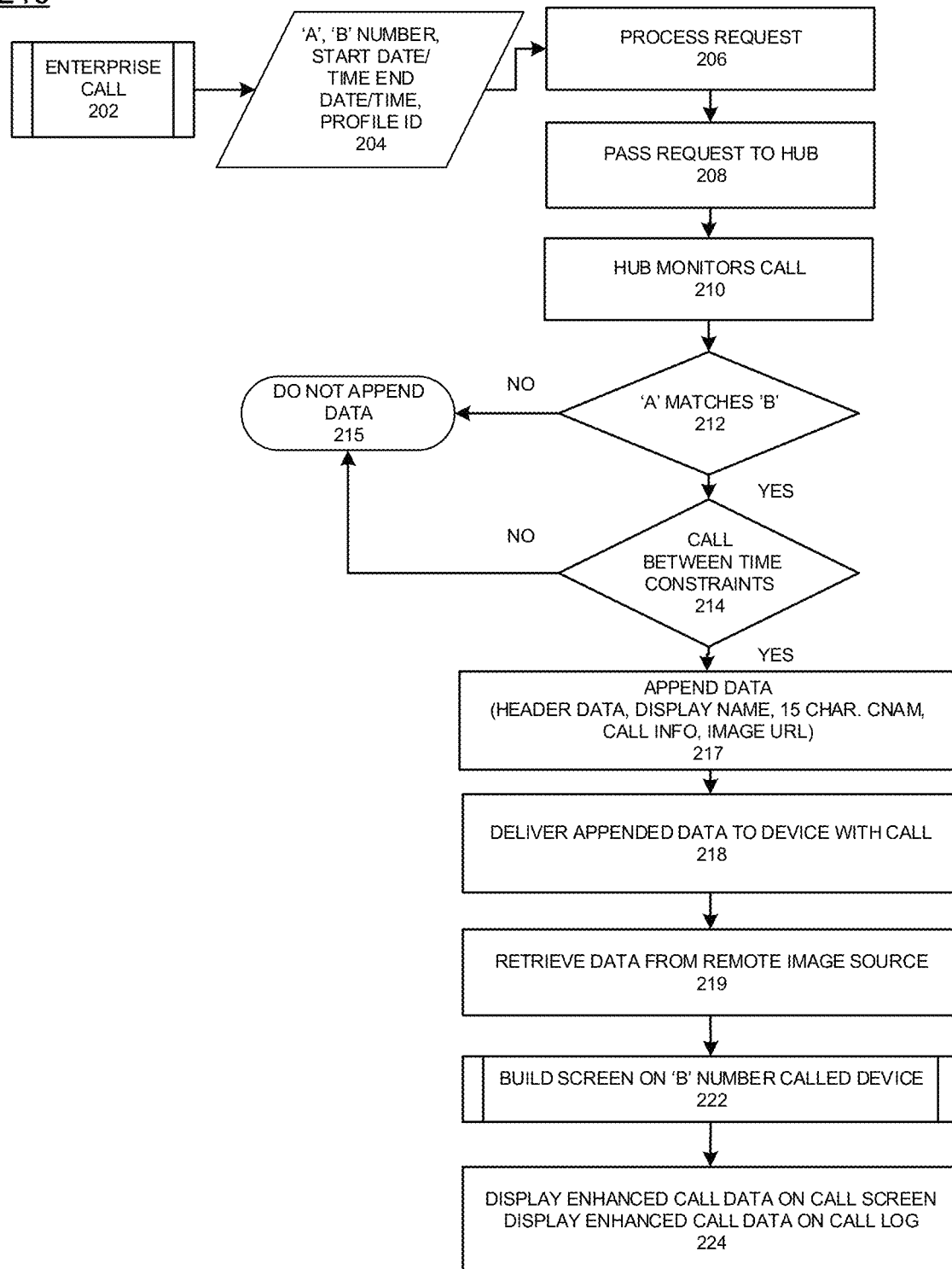
FIG. 2B illustrates an example flow diagram of another example for sharing enhanced content during a call according to example embodiments.
Figure 3B:
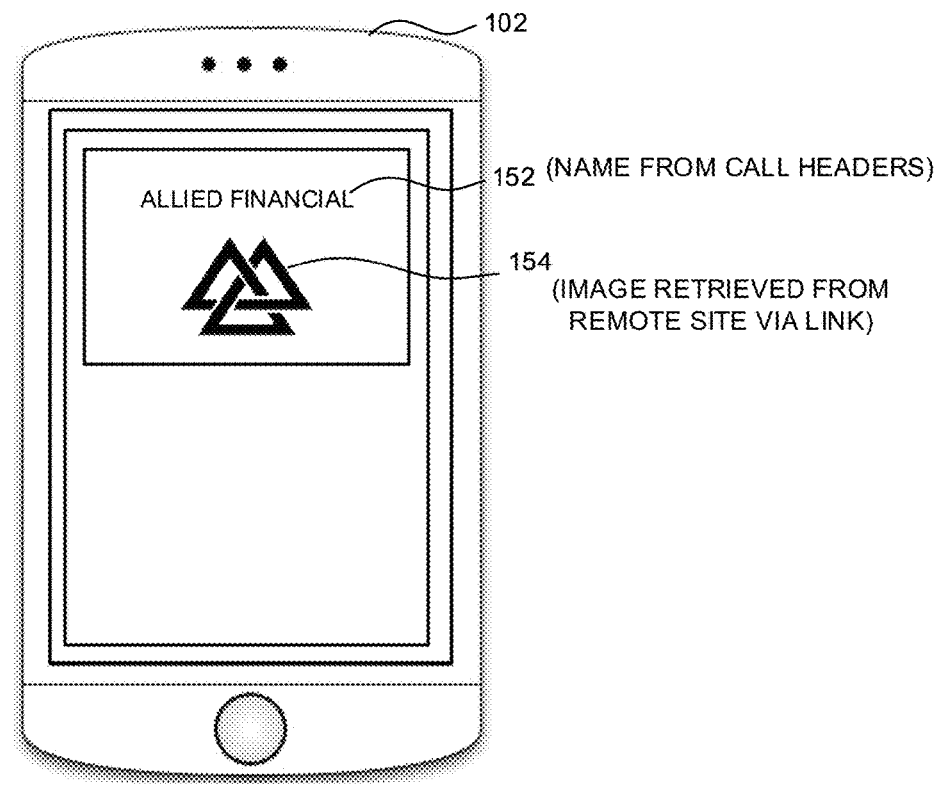
FIG. 3B illustrates another example of a user interface of a call recipient device displaying received enhanced content during a call according to example embodiments.

FIG. 2B illustrates an example flow diagram of another example for sharing enhanced content during a call according to example embodiments. Referring to FIG. 2B, the call flow 240 for delivering enhanced call data includes similar operations to previous examples (like numerals refer to like operations and components), however, in this example, the appended data 217 may include an image URL which is a remote location where the URL identifies so the image data can be retrieved and downloaded 219 to the call recipient device. This example is also illustrated in FIG. 3B.

The call management system will forward the 'A' number, 'B' number, start date/time, end date/time, 15-character business name, and an image URL to the hub 112. When the hub 112 identifies the 'A' number calling the identified 'B' number at a date/time that is between the start date/time and the end date/time, the application will append the 15-character business name in the from header and the image URL in the call-info header.

The 'From:' field may include: "Allied Finance", and the 'Call-Info:' field may include: <http://d1njov4vvqn7ux.cloudfront.net/images/allied.jpg>, which is a link to a content source preferably in the cloud. When the call is placed to the device, the application operating on the device manufacturer may read the data in the 'From' and 'Call-Info' headers and builds the incoming call screen using the data. The software on the device firsts downloads the image from the URL in the 'Call-Info' header, then builds the incoming call screen using that image. That same data is also used to populate the call log.

Figure 2C:
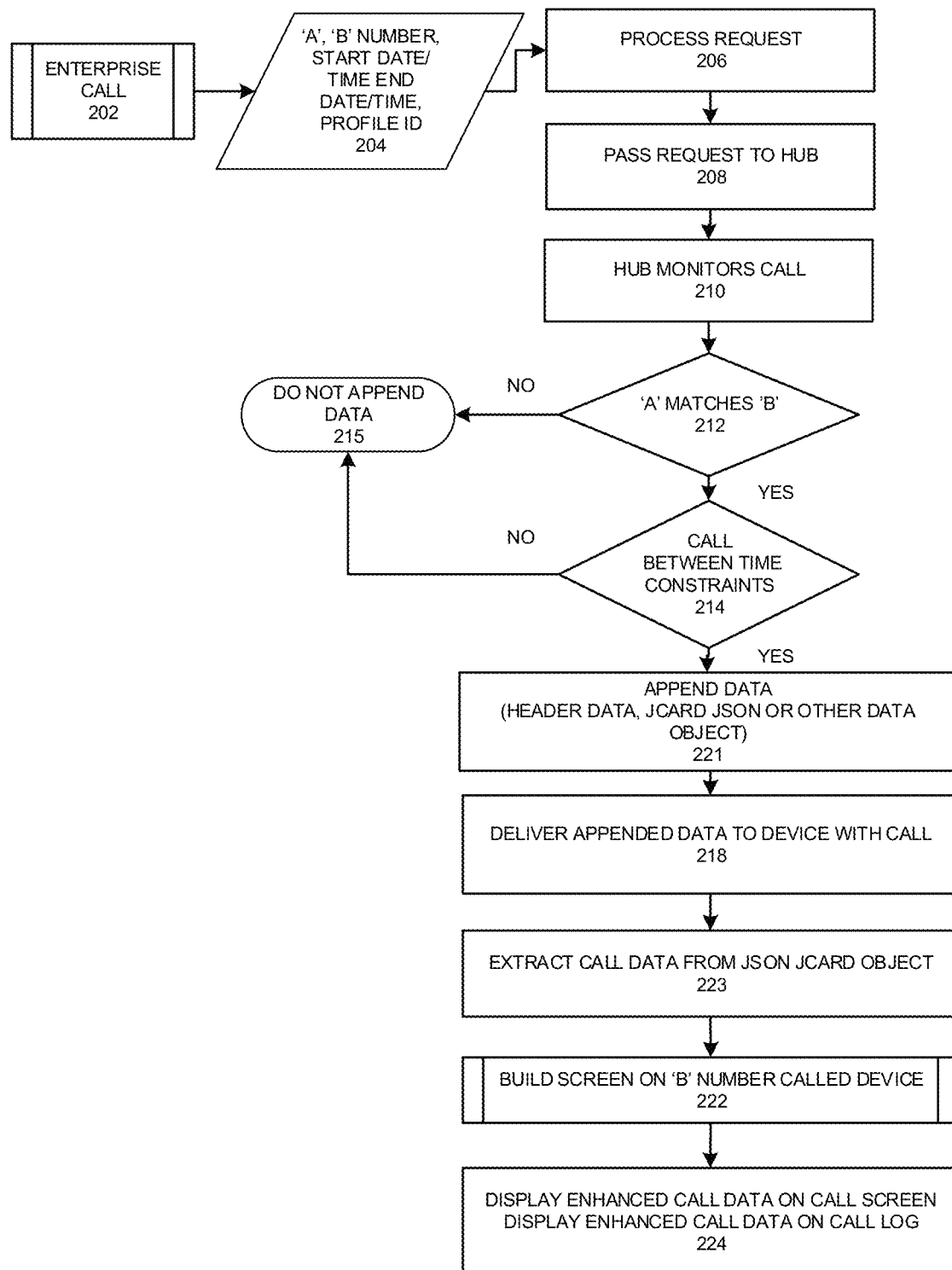
FIG. 2C illustrates an example flow diagram of yet another example for sharing enhanced content during a call according to example embodiments.
Figure 3C:
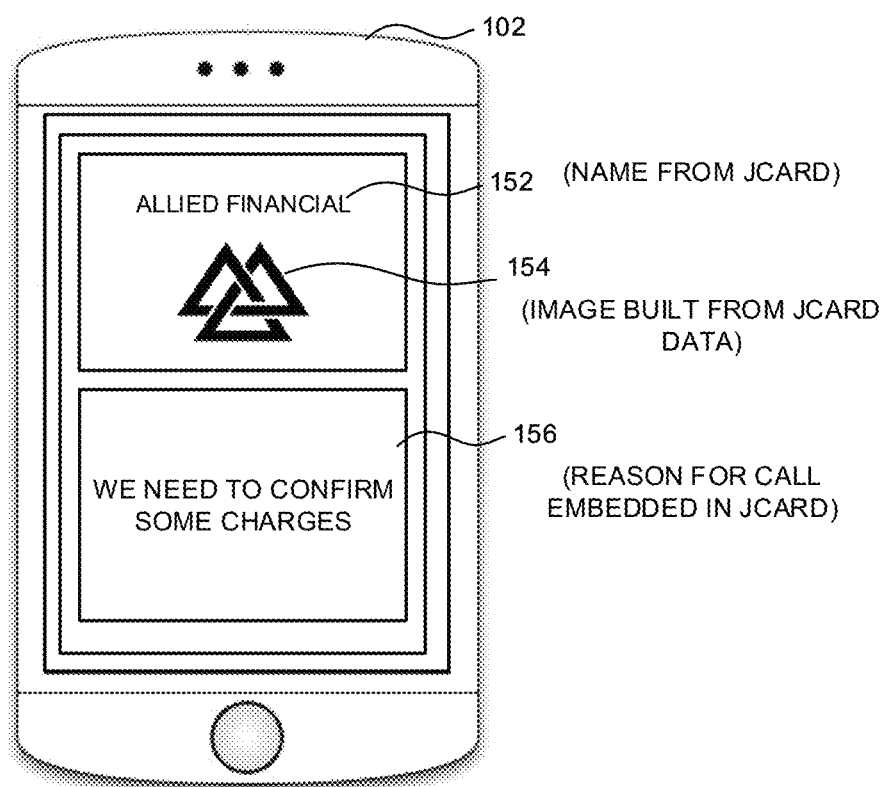
FIG. 3C illustrates yet another example of a user interface of a call recipient device displaying received enhanced content during a call according to example embodiments.

FIG. 2C illustrates an example flow diagram of yet another example for sharing enhanced content during a call according to example embodiments. Referring to FIG. 2C, the call flow 250 for delivering enhanced call data includes similar operations to previous examples (like numerals refer to like operations and components), however, in this example, the appended data 221 may include a jcard and JSON object which identifies enhanced call data to be sent in call message data to the call recipient device. The data is extracted 223 when received and loaded onto the recipient device. This example is also illustrated in FIG. 3C.

The call management system will forward the 'A' number, 'B' number, start date/time, end date/time, and jcard URL to the hub 112. When the hub 112 identifies the 'A' number calling the identified 'B' number at a date/time that is between the start date/time and the end date/time, the application will append the jcard URL in the call-info header.

In this example, the 'Call-Info' header will include a link: https://d1njov4vvqn7.cloudfront.net/vcards/object5.JSON. When the call is placed to the recipient device 102, the software from the device will identify the data in the 'Call-Info' header and build the incoming call screen using the data. The software on the device firsts downloads the jcard from the URL, then it uses the data in the jcard to build the incoming call screen using that image. The name, reason, and image are all embedded in the jcard. The data is also used to populate the call log.

The object data may include:

```
["vcard", [
["version", { }, "text", "4.0"],
["fn", { }, "text", "Allied Financial"],
    ["NICKNAME", { }, "text", "We need to confirm some charges."],
    ["tel", { "type": ["voice", "text", "cell"], "pref": "1" }, "uri",
        "tel:+1-202-555-1000"],
["logo", { }, "uri",
"data:image/jpeg;base64,MIICajCCAdOgAwIBAgICAQEEBQAwdzELMAKGA1U
EBhMCVVMxLDAqBgNVBAoTI05ldHNjYXBlIENvbW11bmljYXRpb25zIENvcn
BvcmF0aW9uMRwwGgYDVQQLExNJbmZvcm1hdGlvbiBTeXN0ZXN0N0<...the remainder
of base64-encoded data...>"
]].
```

Figure 2D:
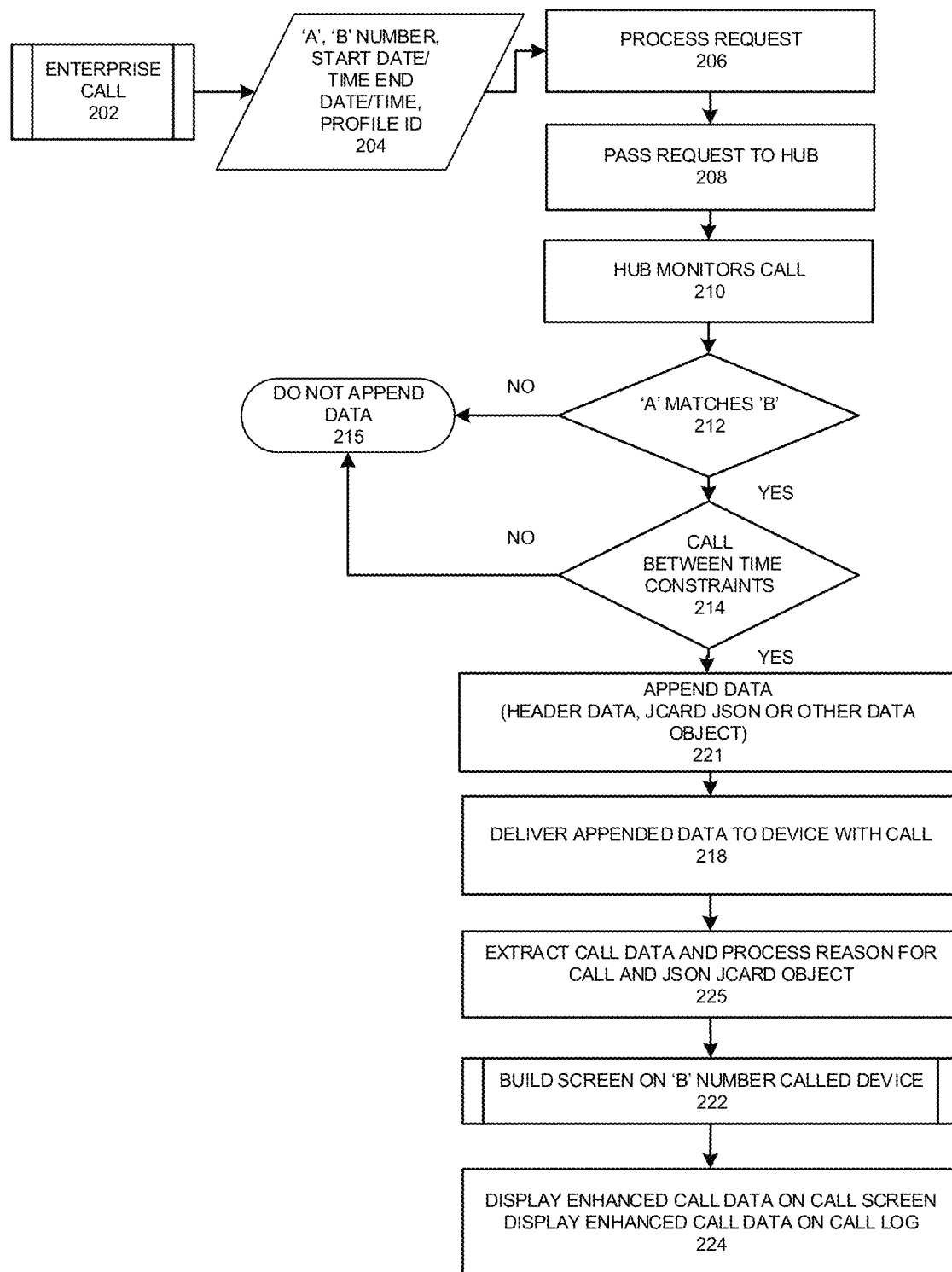
FIG. 2D illustrates an example flow diagram of still another example for sharing enhanced content during a call according to example embodiments.

FIG. 2D illustrates an example flow diagram of still another example for sharing enhanced content during a call according to example embodiments. Referring to FIG. 2D, the call flow 260, for delivering enhanced call data includes similar operations to previous examples (like numerals refer to like operations and components), however, in this example, the appended data 221 may include a jcard and JSON object which identifies enhanced call data to be sent in call message data to the call recipient device. The data is extracted 225 when received and loaded onto the recipient device. In this example, the data includes a reason for the call as a string of information to be loaded on the called device.

Figure 3D:
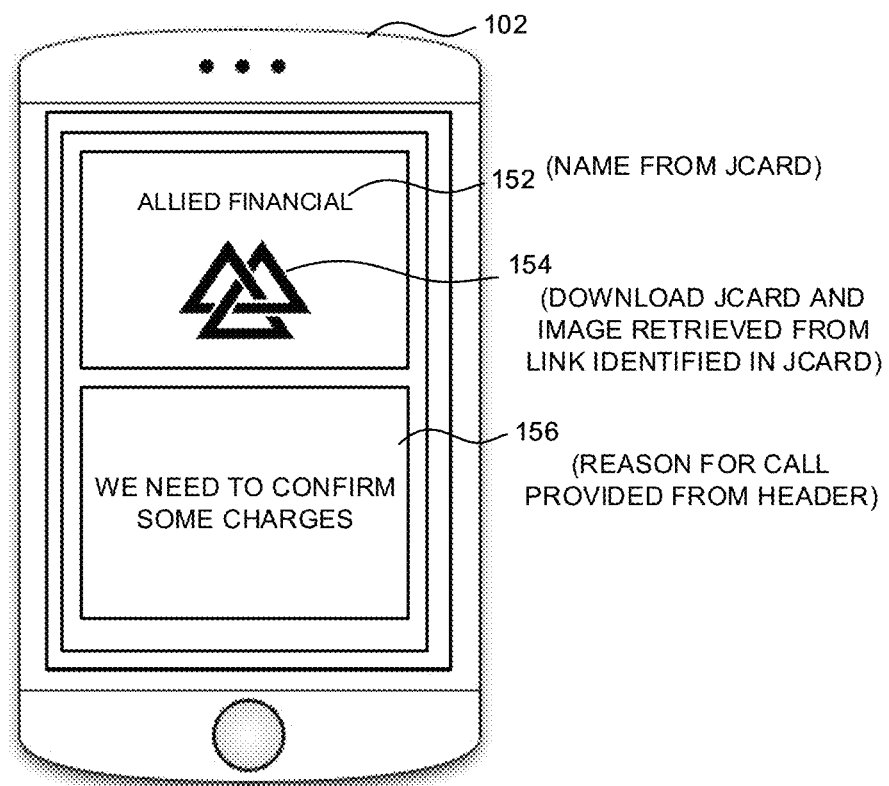
FIG. 3D illustrates still yet another example user interface of a call recipient device according to example embodiments.

The call management system will forward the 'A' number, 'B' number, start date/time, end date/time, and jcard URL to the hub 112. When the hub 112 identifies the 'A' number calling the identified 'B' number at a date/time that is between the start date/time and the end date/time, the application will append the jcard URL in the call-info header. The 'Call-Info' may include: <https://d1njov4vvqn7.cloudfront.net/vcards/object5.JSON>; call-reason="We need to confirm some charges" When the call is placed to the device, the software on the device 102 reads the data in the 'Call-Info' header and builds the incoming call screen using the data. The software on the device firsts downloads the jcard from the URL, then downloads the image from the "logo" URL, then it uses the data in the jcard to build the incoming call screen using that image. The reason comes from the header, while the name and image are embedded in the jcard. The data is also used to populate the call log. This example is also illustrated in FIG. 3D.

In this example, the object code may include:

```
["vcard", [
["version", { }, "text", "4.0"],
["fn", { }, "text", "Allied Financial"],
["tel", { "type": ["voice", "text", "cell"], "pref": "1" }, "uri",
   "tel:+1-202-555-1000"],
["logo", {}, "uri",
"data:image/jpeg;base64,MIICajCCAdOgAwIBAgICAQEEBQAwdzELMAkGA1U
EBhMCVVMxLDAqBgNVBAoTI05ldHNjYXBlIENvbW11bmljYXRpb25zIENvcn
BvcmF0aW9uMRwwGgYDVQQLExNJbmZvcm1hdGlvbiBTeXN0<...the remainder
of base64-encoded data...>"
]].
```

Figure 2E:
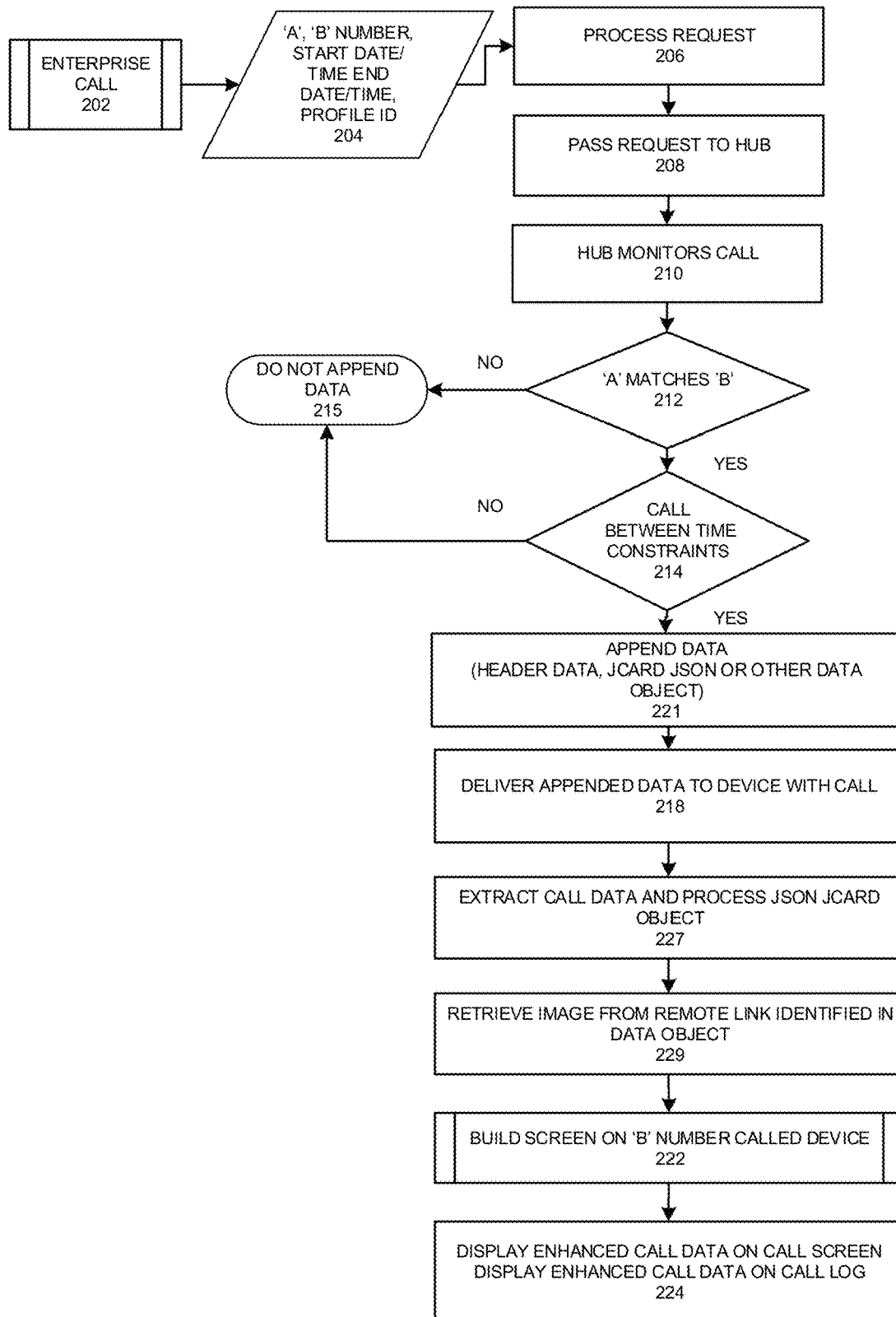
FIG. 2E illustrates an example flow diagram of yet still another example for sharing enhanced content during a call according to example embodiments.
Figure 3E:
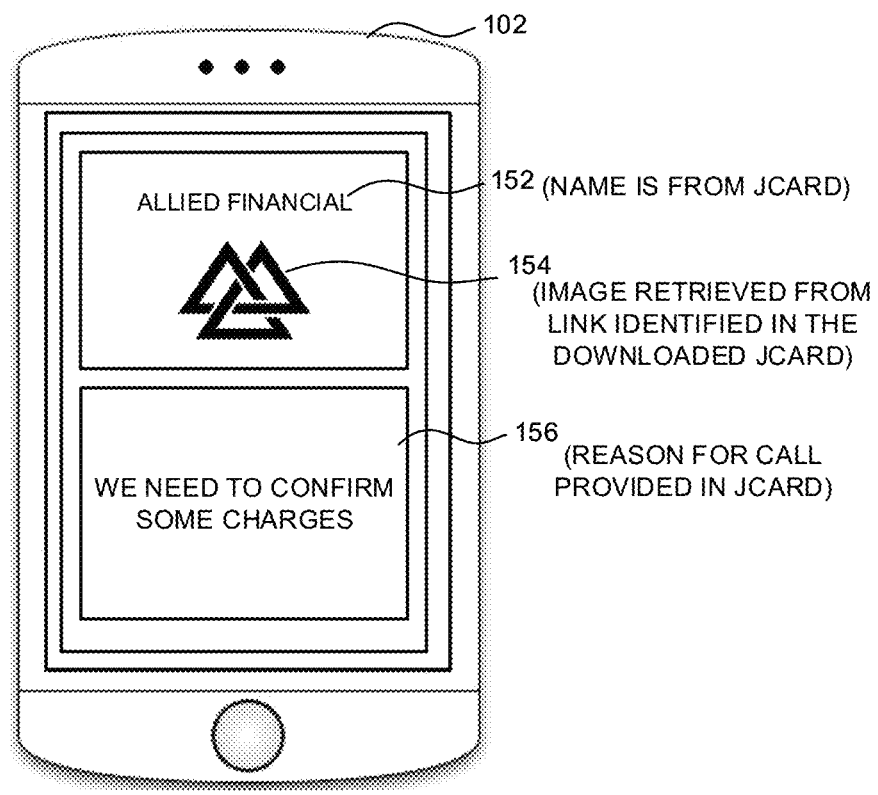
FIG. 3E illustrates still yet a further example of a user interface of a call recipient device displaying received enhanced content during a call according to example embodiments.

FIG. 2E illustrates an example flow diagram of yet still another example for sharing enhanced content during a call according to example embodiments. Referring to FIG. 2E, the call flow 270 for delivering enhanced call data includes similar operations to previous examples (like numerals refer to like operations and components), however, in this example, the appended data 221 may include a jcard and JSON object which identifies enhanced call data to be sent in call message data to the call recipient device. The data is extracted 227 when received and loaded onto the recipient device. The code may include a link to a remote URL site 229 where an image can be downloaded and loaded separately and displayed during the call. This example is also illustrated in FIG. 3E.

The call management system will forward the 'A' number, 'B' number, start date/time, end date/time, and jcard URL to the hub 112. When the hub 112 identifies the 'A' number calling the identified 'B' number at a date/time that is between the start date/time and the end date/time, the application will append the jcard URL in the call-info header. The 'Call-Info' may include: https://d1njov4vvqn7.cloudfront.net/vcards/object5.JSON.

When the call is placed to the device, the software from the phone manufacturer reads the data in the 'Call-Info' header and builds the incoming call screen using the data. The software on the device firsts downloads the jcard from the URL, then it uses the data in the jcard to build the incoming call screen using that image. The name and reason embedded in the jcard, while the image is downloaded from the URL in the jcard. The data is also used to populate the call log.

In this example, the object code may include:

```
["vcard", [
["version", { }, "text", "4.0"],
["fn", { }, "text", "Allied Financial"],
["NICKNAME", { }, "text", "We need to confirm some charges."],
["tel", { "type": ["voice", "text", "cell"], "pref": "1" }, "uri",
   "tel:+1-202-555-1000"],
["logo", { }, "uri", "http://d1njov4vvqn7.cloudfront.net/images/af.jpg"]
]].
```

Figure 2F:
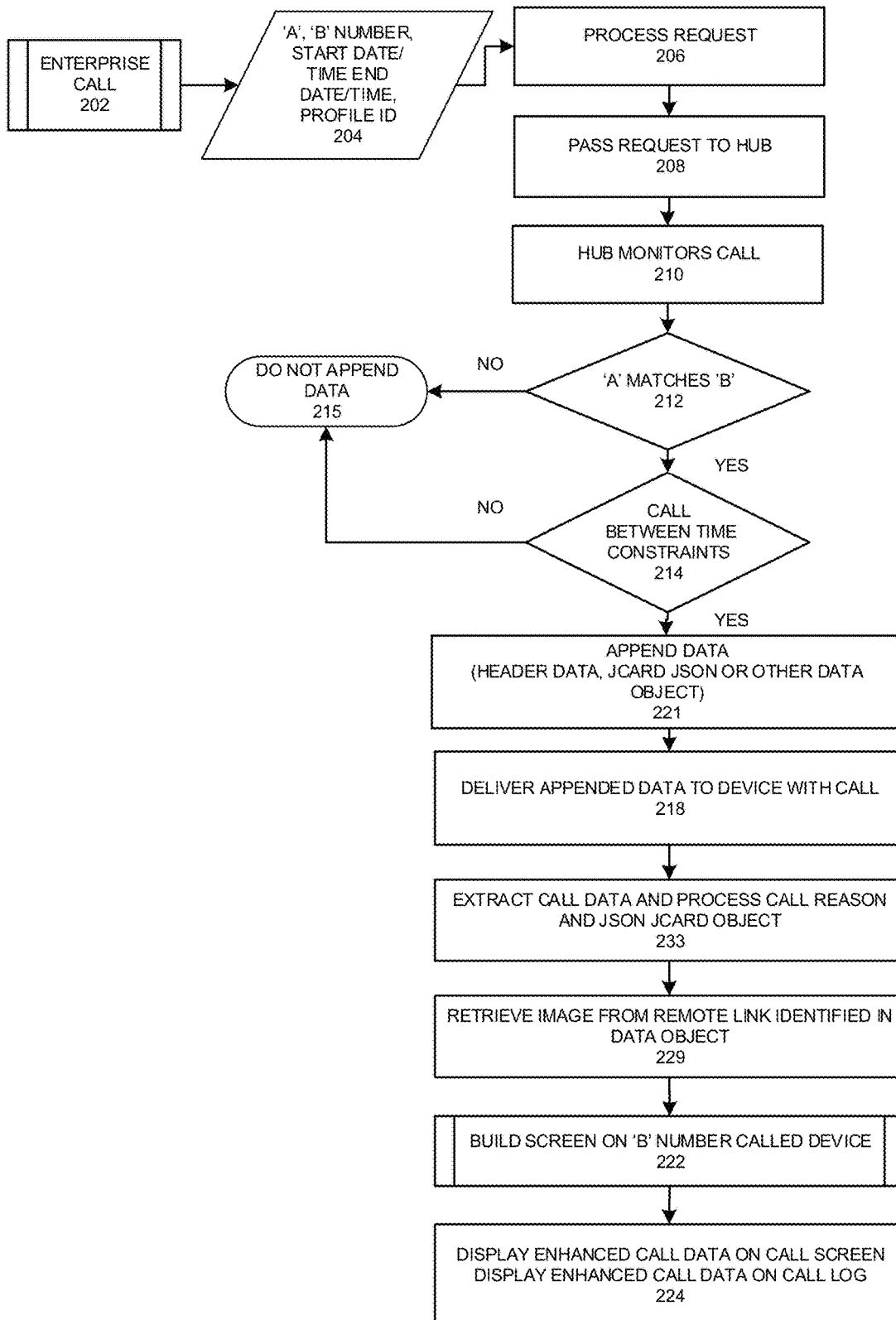
FIG. 2F illustrates an example flow diagram of sharing enhanced content during a call according to example embodiments.
Figure 3F:
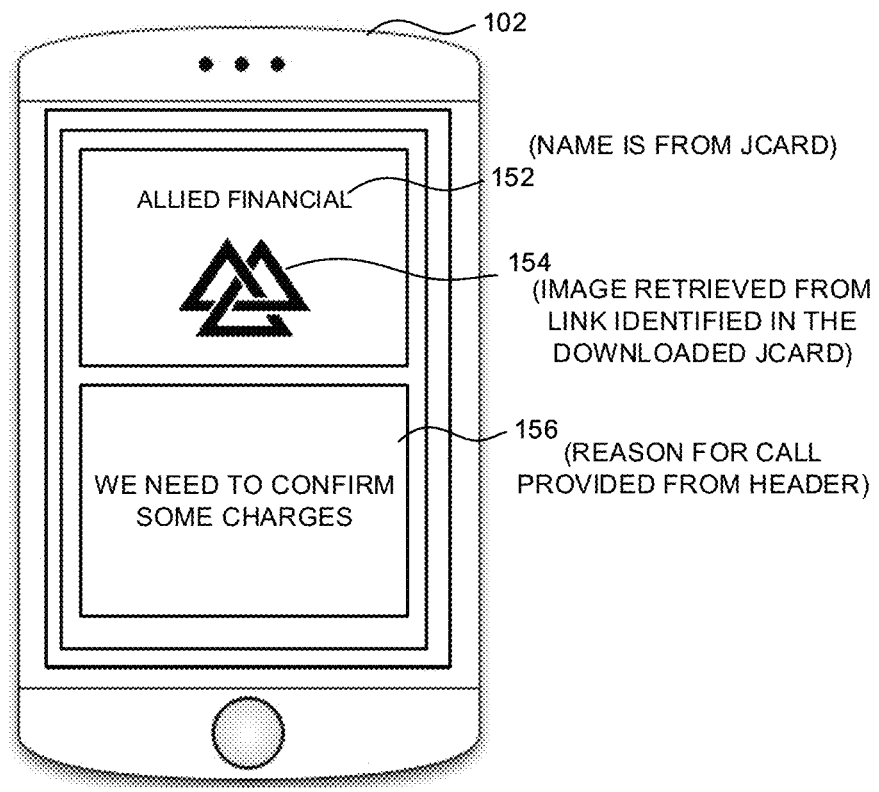
FIG. 3F illustrates still yet another example of a user interface of a call recipient device displaying received enhanced content during a call according to example embodiments.

FIG. 2F illustrates an example flow diagram of sharing enhanced content during a call according to example embodiments. Referring to FIG. 2F, the call flow 280 for delivering enhanced call data includes similar operations to previous examples (like numerals refer to like operations and components), however, in this example, the appended data 221 may include a jcard and JSON object which identifies enhanced call data to be sent in call message data to the call recipient device. The data is extracted 233 when received and loaded onto the recipient device and may include a call reason for the call. The code may include a link to a remote URL site 229 where an image can be downloaded and loaded separately and displayed during the call. This example is also illustrated in FIG. 3F.

The call management system will forward the 'A' number, 'B' number, start date/time, end date/time, and jcard URL to the hub 112. When the hub 112 identifies the 'A' number calling the identified 'B' number at a date/time that is between the start date/time and the end date/time, the application will append the jcard URL in the call-info header.

The information in the 'Call-Info' field may include: <https://d1njov4vvqn7.cloudfront.net/vcards/object5.JSON>; call-reason="We need to confirm some charges".

When the call is placed to the device, the software from the phone manufacturer reads the data in the 'Call-Info' header and builds the incoming call screen using the data. The software on the device firsts downloads the jcard from the URL, then downloads the image from the "logo" URL, then it uses the data in the jcard to build the incoming call screen using that image. The reason information for the call display comes from the header, while the name is embedded in the jcard. The image is downloaded from the URL in the jcard. The data is also used to populate the call log.

The call data may include:

```
["vcard", [
["version", { }, "text", "4.0"],
["fn", { }, "text", "Allied Financial"],
["tel", { "type": ["voice", "text", "cell"], "pref": "1" }, "uri",
   "tel:+1-202-555-1000"],
["logo", { }, "uri", "http://d1njov4vvqn7.cloudfront.net/images/af.jpg"]
]].
```

FIG. 3A illustrates one example of a user interface of a call recipient device displaying received enhanced content during a call according to example embodiments. Referring to FIG. 3A, the example user interface 300 includes an entity name, such as a caller ID 152 and a logo image 154. This example user interface 300 on the call receiving device 102 is based on the example of FIG. 2A where the display name 152 is sent with base64 image data to create the logo 154. Each example demonstrates a different scenario for sharing enhanced data with a call recipient.

FIG. 3B illustrates another example of a user interface of a call recipient device displaying received enhanced content during a call according to example embodiments. Referring to FIG. 3B, the example user interface 340 includes an entity name, such as a caller ID 152 and a logo image 154. This example user interface 340 on the call receiving device 102 is based on the example of FIG. 2B where the display name 152 is sent as a name identified from call header data and with a link to retrieve the image data to download the logo 154. Each example demonstrates a different scenario for sharing enhanced data with a call recipient.

FIG. 3C illustrates yet another example of a user interface of a call recipient device displaying received enhanced content during a call according to example embodiments. Referring to FIG. 3C, the example user interface 350 includes an entity name, such as a caller ID 152 and a logo image 154. This example user interface 350 on the call receiving device 102 is based on the example of FIG. 2C where the display name 152 is sent with a link to image data to download the logo 154. Also, the information provided including the name 152, image and the reason for calling 156 are all part of a jcard JSON object which provides code where the data is extracted. This example also includes a reason for the call 156. Each example demonstrates a different scenario for sharing enhanced data with a call recipient.

FIG. 3D illustrates still yet another example user interface of a call recipient device according to example embodiments. Referring to FIG. 3D, the example user interface 360 includes an entity name, such as a caller ID 152 and a logo image 154. This example user interface 360 on the call receiving device 102 is based on the example of FIG. 2D where the display name 152 is sent with the jcard, and the link is included in the jcard to download the image data/logo 154. Also, the information provided is part of a jcard JSON object which provides code where the data is extracted. This example also includes a reason for the call 156 which is part of the call header data received. Each example demonstrates a different scenario for sharing enhanced data with a call recipient.

FIG. 3E illustrates still yet a further example of a user interface of a call recipient device displaying received enhanced content during a call according to example embodiments. Referring to FIG. 3E, the example user interface 370 includes an entity name, such as a caller ID 152 and a logo image 154. This example user interface 370 on the call receiving device 102 is based on the example of FIG. 2E where the display name 152 is sent with a link to image data to download the logo 154. Also, the information provided is part of a jcard JSON object which provides code where the data is extracted. This example also includes a reason for the call 156 which is a message included in the jcard. Each example demonstrates a different scenario for sharing enhanced data with a call recipient.

FIG. 3F illustrates still yet another example of a user interface of a call recipient device displaying received enhanced content during a call according to example embodiments. Referring to FIG. 3F, the example user interface 380 includes an entity name, such as a caller ID 152 and a logo image 154. This example user interface 380 on the call receiving device 102 is based on the example of FIG. 2F where the display name 152 is sent as part of a jcard with a link to image data to download the logo 154. Also, the information provided is part of a jcard JSON object which provides code where the data is extracted. This example also includes a reason for the call 156 as information extracted from a call header. Each example demonstrates a different scenario for sharing enhanced data with a call recipient.

Figure 4:
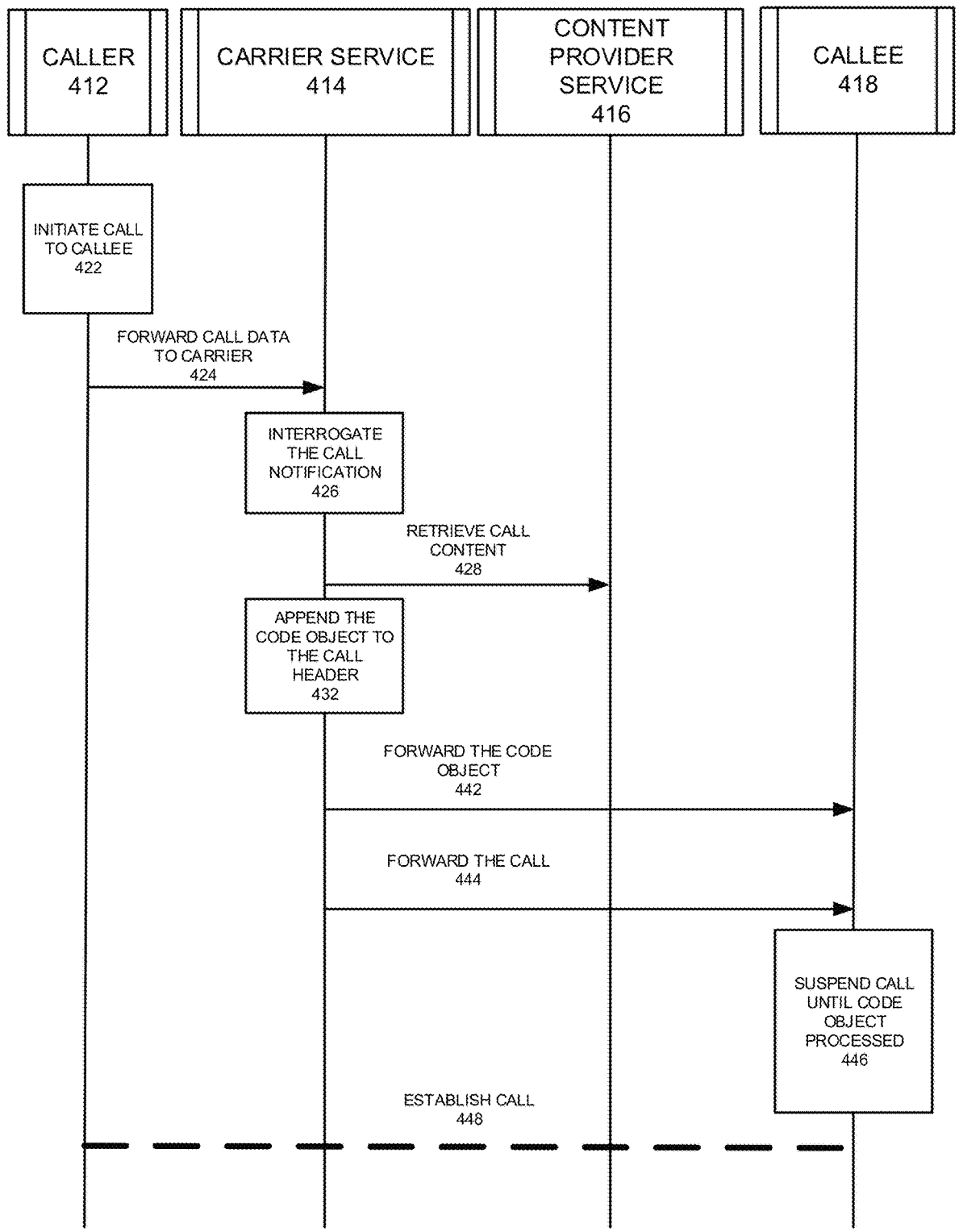
FIG. 4 illustrates a system configuration diagram of a call being identified and a call message being modified to share enhanced call content data according to example embodiments.

FIG. 4 illustrates a system configuration diagram of a call being identified and a call message being modified to share enhanced call content data according to example embodiments. Referring to FIG. 4, the system 400 provides identifying a call notification of a call intended for a mobile device (callee) 422 by the carrier service network 414, which may include the edge server 114, the hub 112 or any other network node. The call is forwarded 424 to the carrier network and the call data is interrogated 426 to identify and retrieve call data with a code object identifier with the call notification, the content may be retrieved 428 from the content provider service 416, such as a database storing the enhanced call content profiles. The call content is appended to the code object data in the call message header(s) 432 and the code object is forwarded 442 before or during the call being forwarded 444 to the callee mobile device 418. In this example, the code object data is forwarded prior to the call being forwarded. The code object identifier is used to select the enhanced call profile with the corresponding call data.

The call interrogation process may include attempting to pair the 'A' number with a known enhanced content profile(s) stored in the database. The process may also include identifying the 'B' number and using that information as the basis for selecting an enhanced call profile. The process may also include receiving a confirmation message that the code object was extracted and loaded on the mobile device, such as a confirmation message being sent form the mobile device 418 to the carrier service entity 414 to confirm the content is loaded and the call is ready to be sent or connected in the event that the call was already sent to the callee 418. For example, the call may be held in suspension 446 on the mobile device 418 until the content is retrieved from a remote site (i.e., URL content link) and loaded. For example, the content may be created based on information identified from the code object of the header message data sent to the device, such content is provided on a display of the mobile device prior to connecting the call 448 to the mobile device. The content created is a base64 image identified from the code object and the code object may be a JAVASCRIPT object notation (JSON) object.

Figure 5:
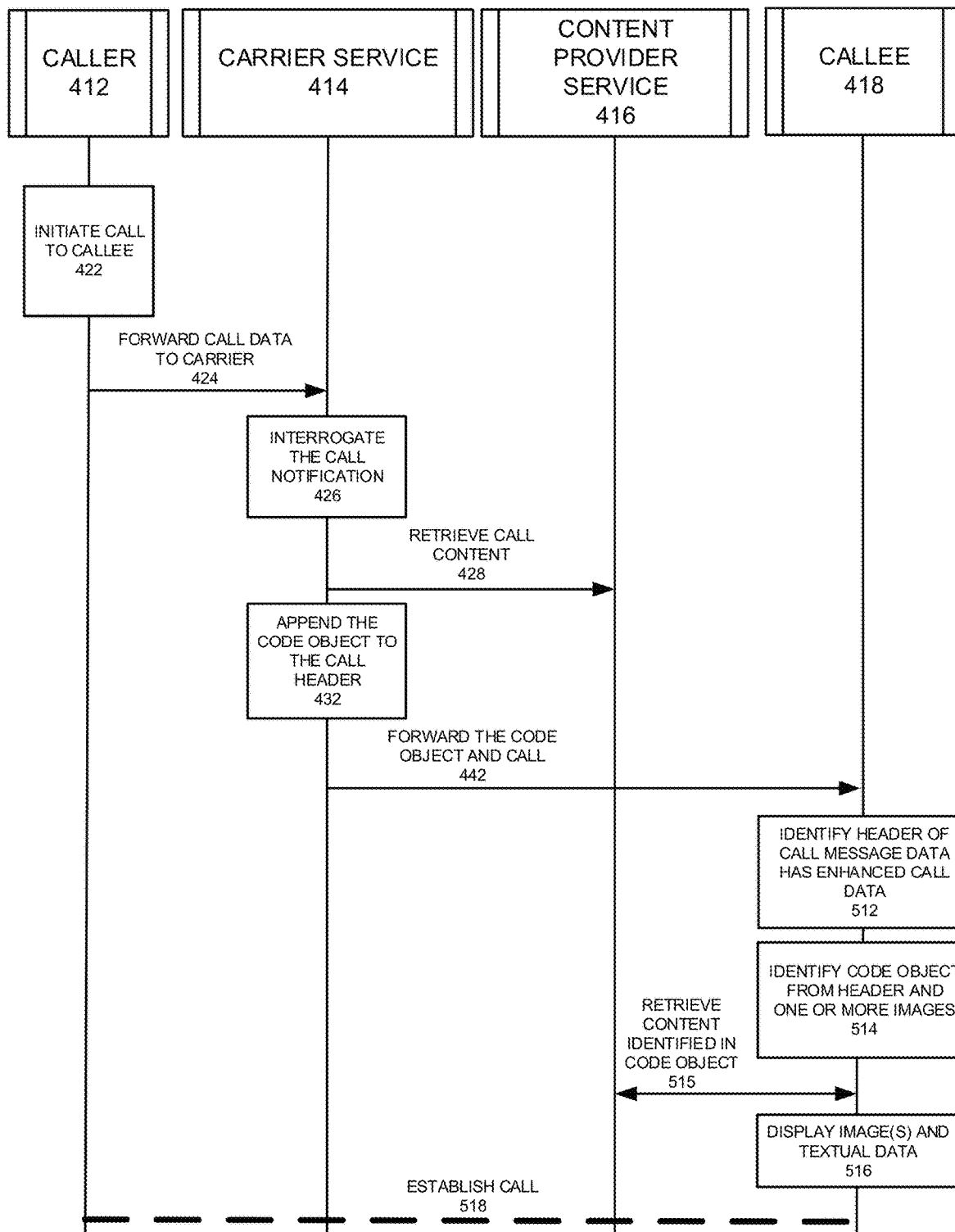
FIG. 5 illustrates a system configuration diagram of a call being identified and a call message being processed to extract enhanced call content data according to example embodiments.

FIG. 5 illustrates a system configuration diagram of a call being identified and a call message being processed to extract enhanced call content data according to example embodiments. Referring to FIG. 5, like reference numerals refer to like operations, the system 500 provides identifying a call notification of a call intended for a mobile device (callee) 422 by the carrier service network 414, which may include the edge server 114, the hub 112 or any other network node. The call is forwarded 424 to the carrier network and the call data is interrogated 426 to identify and retrieve call data with a code object identifier with the call notification, the content may be retrieved 428 from the content provider service 416, such as a database storing the enhanced call content profiles. The call content is appended to the code object data in the call message header(s) 432 and the code object is forwarded 442 before or during the call being forwarded to the callee mobile device 418. In this example, the code object data is forwarded with the call being forwarded. The code object identifier is used to select the enhanced call profile with the corresponding call data. The process may include identifying a header of a call message includes enhanced call data 512, and identifying 514 a code object from the call header which identifies textual information and one or more images to display during a call connection. The content identified in the object code may be retrieved 514 from the content provider service 416 or the carrier 414. The content is displayed 516 to include the textual information and the one or more images identified from the code object on the mobile device 418. The call is then connected 518 to the mobile device.

During a call setup process, the code received may cause retrieving one or more images from a remote site identified by a link in the code object. The received call may be held in suspension until the textual information and the one or more images are displayed on the mobile device. The one or more images may be created from the base64 code identified in the code object. The code object may include a telephone number of a caller, a telephone number of the mobile device, one or more textual character strings and base64 code identifying an image or a link to an image. The process may also include decoding the base64 image from the base64 code and displaying the decoded image on the mobile device display. The process may also include identifying a start date and start time and an end date and end time from the code object, and when the end time and end date have matured, removing the textual information and the one or more images identified from the code object from the mobile device. The header of the message may be part of a session initiation protocol (SIP) packet.

Figure 6:
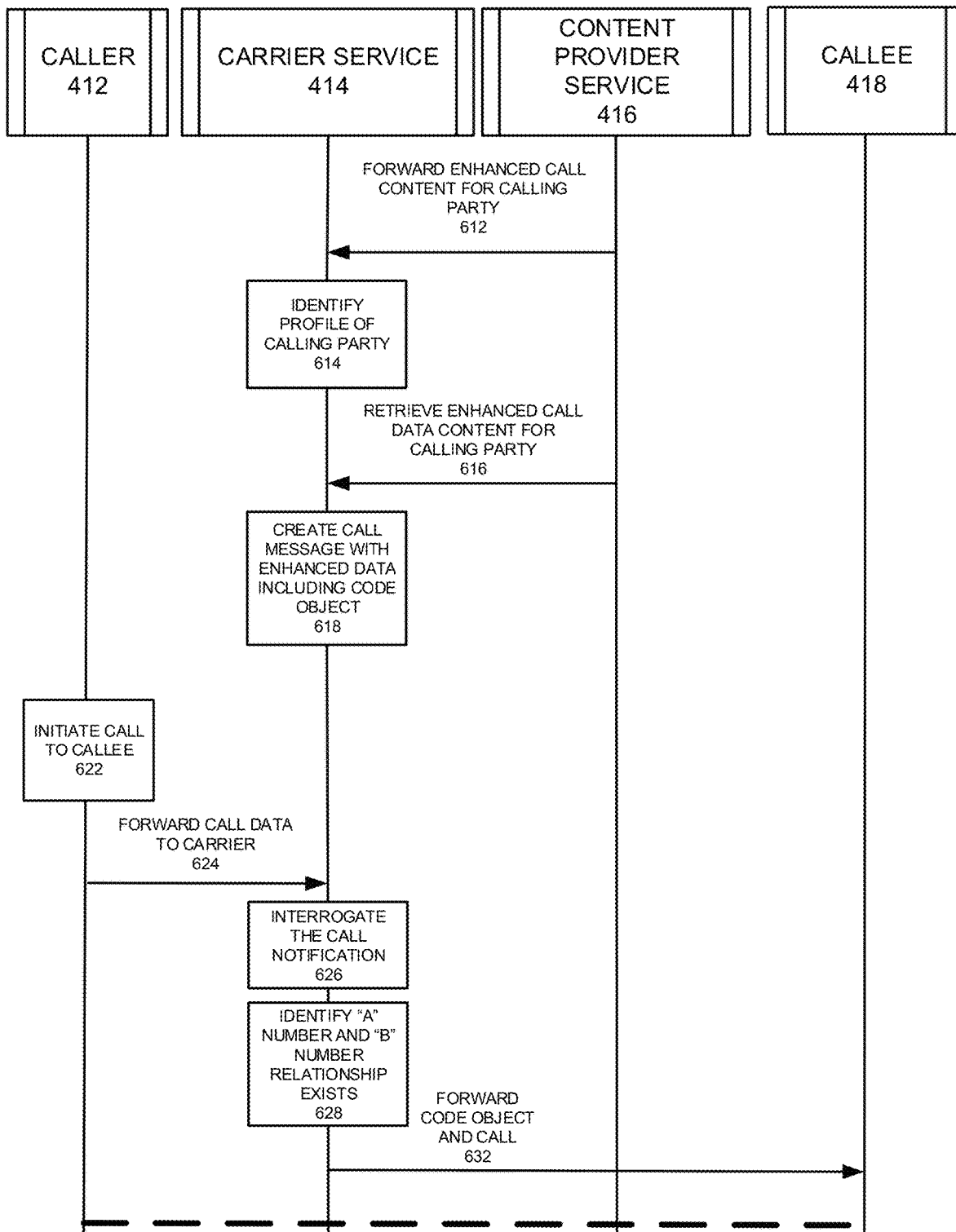
FIG. 6 illustrates a system configuration diagram of a creating enhanced call data prior to performing a call according to example embodiments.

FIG. 6 illustrates a system configuration diagram of a creating enhanced call data prior to performing a call according to example embodiments. Referring to FIG. 6, the system 600 includes receiving enhanced call content for a calling party 612 at the carrier service network 414 so a profile can be identified 614 that corresponds with the enhanced call data, the enhanced call data content 616 may be retrieved for the calling party 412 depending on the information received. The calling party may have a default profile, multiple profiles or other information that will be used to populate the called device display during a call. When the content is retrieved, the textual data, images, or code that identifies such data is appended to a call message to create a modified call message with a code object 618. When a call is sent 622, the call data is forwarded 624 to the carrier 414 and the call notification information may be interrogated 626 to identify the correct call profile to share with the callee 418. One approach to identifying a call profile of enhanced call data to append to the call message information is to identify a relationship with the 'A' caller number and the 'B' called number. When such a relationship exists 628, the profile selected may be identified by the relationship, such as this 'B' number is assigned this profile from this 'A' number. The code object may be selected to include the particular profile enhanced call data and included in the call message header with a code object including the enhanced call information to include with a call message when placing the future call 632. The call data may include a calling party number, a called party number, a start time and an end time for sharing enhanced call data with the called party, and a start date and end date for sharing the enhanced call data with the called party.

Figure 7:
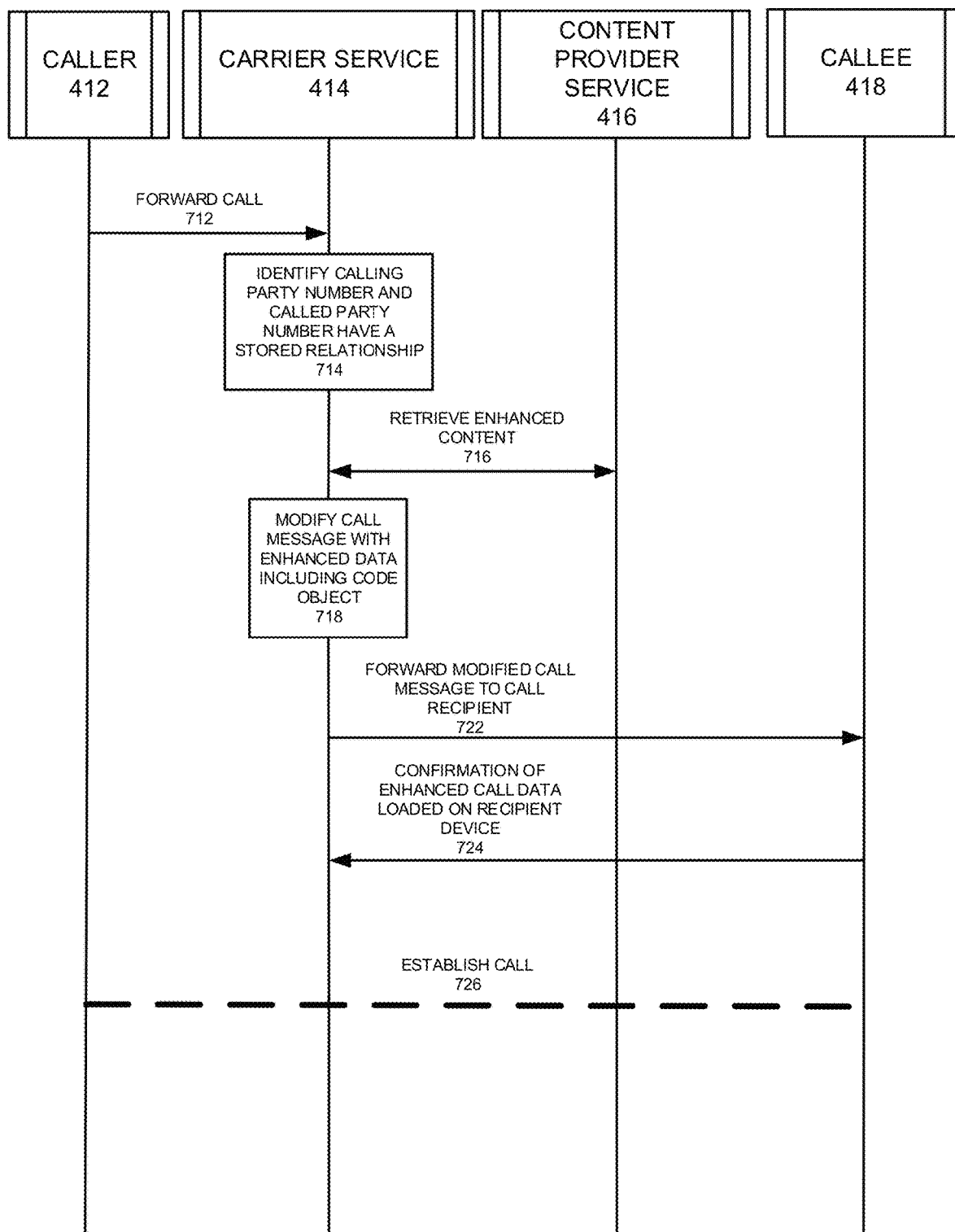
FIG. 7 illustrates a system configuration diagram of identifying a known match between calling and called parties when modifying enhanced call content of a call according to example embodiments.

FIG. 7 illustrates a system configuration diagram of identifying a known match between calling and called parties when modifying enhanced call content of a call according to example embodiments. Referring to FIG. 7, when a call is received 712 from a calling device 412, the carrier service 414 may identify the calling party number and the called party number have a pre-stored relationship 714 stored in a database. When the relationship is identified, the content can be retrieved 716 and the call message header of the call message may be modified 718 to include a code object identifying the enhanced call content associated with the pre-existing relationship. The process may also include forwarding the modified call message to an intended recipient device of the call 722. The method may also include receiving a confirmation 724 that the code object information was loaded on a display of the intended recipient device, and connecting the call 726 to the intended recipient device.

In the event that a pre-existing relationship does not exist in the database, the call message header may be modified to include a code object identifying an alternative enhanced call content profile, such as a default profile and forwarding the modified call message with the alternative enhanced call content profile to an intended recipient device of the call. The alternative enhanced call content profile includes default profile information and the enhanced call content may include information assigned to the pre-existing relationship. The process may also include holding the call in suspension on the intended recipient device, retrieving content identified from the code object from a remote site, and forwarding the content to the intended recipient device prior to connecting the call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 8:
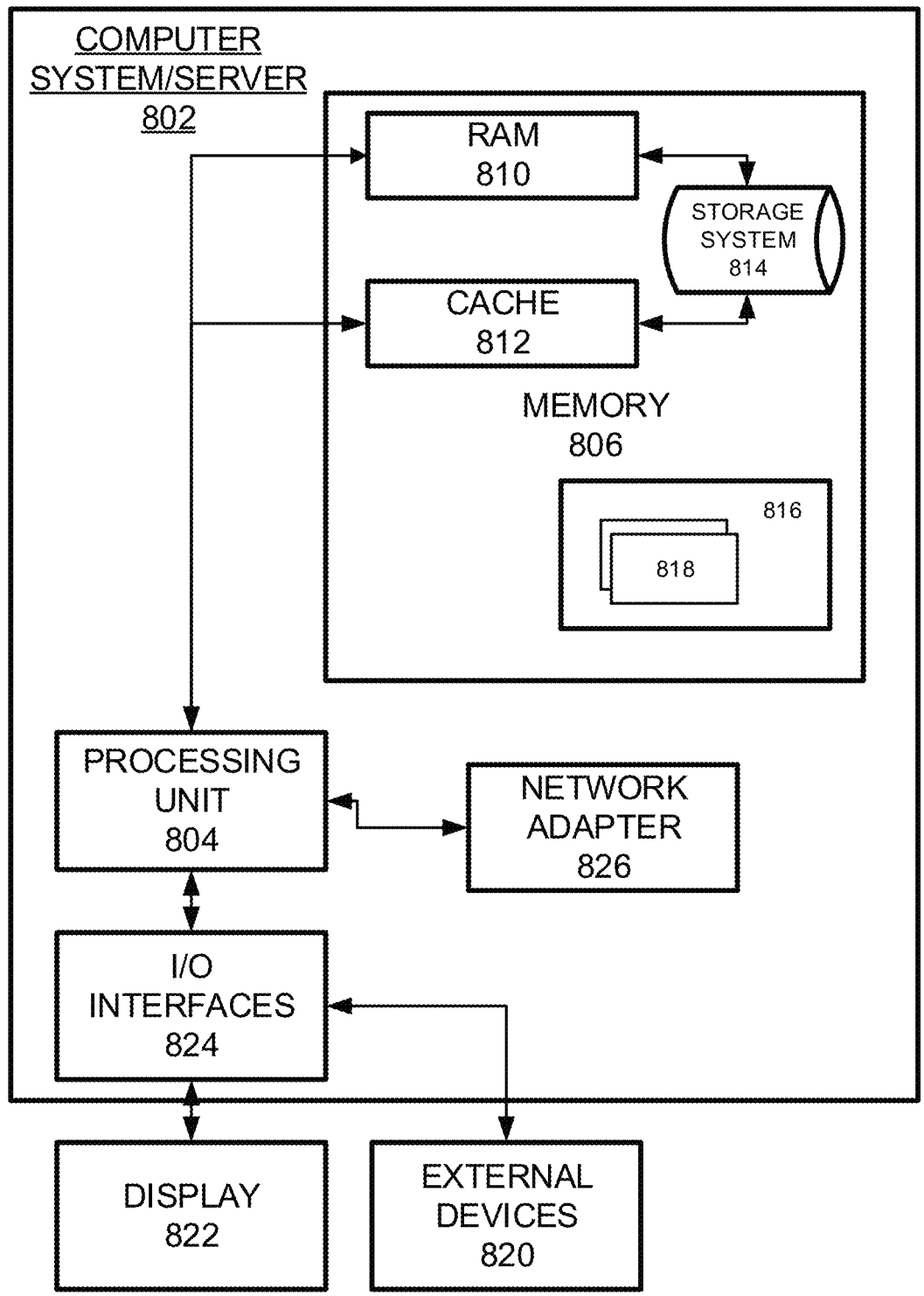
FIG. 8 illustrates an example network entity device configured to store instructions, software, and corresponding hardware for executing the same according to example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via 110 interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying a code object from a call header identifying textual information and one or more images to display during a call connection; and
displaying the textual information and the one or more images identified from the code object on a mobile device;
wherein a start date and start time and an end date and end time is identified from the code object; and
wherein the textual information and the one or more images identified from the code object are removed when the end time and end date have matured.

2. The method of claim 1, comprising
receiving a call at the mobile device; and
holding the call in suspension until the textual information and the one or more images are displayed on the mobile device; and
retrieving the one or more images from a remote site identified by a link in the code object.

3. The method of claim 1, comprising
receiving a call at the mobile device; and
holding the call in suspension until the textual information and the one or more images are displayed on the mobile device; and
creating the one or more images identified in the code object.

4. The method of claim 3, wherein the creating the one or more images is from base64 code identified in the code object.

5. The method of claim 1, wherein the code object comprises a telephone number of a caller a telephone number of the mobile device, and one or more textual character strings.

6. The method of claim 1, wherein the call header is part of a session initiation protocol (SIP) packet.

7. The method of claim 1, comprising
connecting a call to the mobile device.

8. An apparatus comprising
a processor configured to
identify a code object from a call header that identifies textual information and one or more images to display on a call connection; and
display the textual information and the one or more images identified from the code object on a mobile device;
wherein a start date and start time and an end date and end time is identified from the code object; and
wherein the textual information and the one or more images identified from the code object are removed when the end time and end date have matured.

9. The apparatus of claim 8, further comprising
a receiver configured to receive a call; and
wherein the processor is further configured to
hold the call in suspension until the textual information and the one or more images are displayed on the mobile device; and
retrieve the one or more images from a remote site identified by a link in the code object.

10. The apparatus of claim 8, further comprising
a receiver configured to receive a call; and
wherein the processor is further configured to
hold the call in suspension until the textual information and the one or more images are displayed on the mobile device; and
create the one or more images identified in the code object.

11. The apparatus of claim 10, wherein the creation of the one or more images is from base64 code identified in the code object.

12. The apparatus of claim 8, wherein the code object comprises a telephone number of a caller a telephone number of the mobile device, and one or more textual character strings.

13. The apparatus of claim 8, wherein the call header is part of a session initiation protocol (SIP) packet.

14. The apparatus of claim 8, further comprising
connect a call to the mobile device.

15. A non-transitory computer readable storage medium configured to store instructions that when executed cause a processor to perform:
identifying a code object from a call header identifying textual information and one or more images to display during a call connection; and
displaying the textual information and the one or more images identified from the code object on a mobile device;
wherein a start date and start time and an end date and end time is identified from the code object; and
wherein the textual information and the one or more images identified from the code object are removed when the end time and end date have matured.

16. The non-transitory computer readable storage medium of claim 15, wherein the processor is further configured to perform:
receiving a call at the mobile device; and
holding the call in suspension until the textual information and the one or more images are displayed on the mobile device; and
retrieving the one or more images from a remote site identified by a link in the code object.

17. The non-transitory computer readable storage medium of claim 15, wherein the processor is further configured to perform:
receiving a call at the mobile device; and
holding the call in suspension until the textual information and the one or more images are displayed on the mobile device; and
creating the one or more images identified in the code object.

18. The non-transitory computer readable storage medium of claim 15, wherein the code object comprises a telephone number of a caller a telephone number of the mobile device, and one or more textual character strings.

19. The non-transitory computer readable storage medium of claim 15, wherein the call header is part of a session initiation protocol (SIP) packet.

20. The non-transitory computer readable storage medium of claim 15, wherein the processor is further configured to perform:
connecting a call to the mobile device.

* * * * *